(12) United States Patent
Yang

(10) Patent No.: US 12,289,544 B2
(45) Date of Patent: Apr. 29, 2025

(54) IMAGE ACQUISITION METHOD, ELECTRONIC DEVICE, AND NON-TRANSITORY COMPUTER-READABLE STORAGE MEDIUM FOR OBTAINING A TARGET IMAGE WITH A SAME RESOLUTION AS RESOLUTION OF A PIXEL ARRAY

(71) Applicant: GUANGDONG OPPO MOBILE TELECOMMUNICATIONS CORP., LTD., Dongguan (CN)

(72) Inventor: Xin Yang, Dongguan (CN)

(73) Assignee: GUANGDONG OPPO MOBILE TELECOMMUNICATIONS CORP., LTD. (CN)

( * ) Notice: Subject to any disclaimer, the term of this patent is extended or adjusted under 35 U.S.C. 154(b) by 301 days.

(21) Appl. No.: 17/940,780

(22) Filed: Sep. 8, 2022

(65) Prior Publication Data
US 2023/0017746 A1    Jan. 19, 2023

Related U.S. Application Data

(63) Continuation of application No. PCT/CN2021/073292, filed on Jan. 22, 2021.

(30) Foreign Application Priority Data

Mar. 11, 2020    (CN) .................... 202010166269.2

(51) Int. Cl.
*H04N 25/589*    (2023.01)
*G06T 5/50*    (2006.01)
(Continued)

(52) U.S. Cl.
CPC ............ *H04N 25/589* (2023.01); *G06T 5/50* (2013.01); *G06T 5/92* (2024.01); *H04N 23/741* (2023.01)

(58) Field of Classification Search
None
See application file for complete search history.

(56) References Cited

U.S. PATENT DOCUMENTS 9,608,019 B2    3/2017    Lyu et al.
2009/0251575 A1    10/2009    Wada
(Continued)

FOREIGN PATENT DOCUMENTS

CN    101233763 A    7/2008
CN    102369721 A    3/2012
(Continued)

OTHER PUBLICATIONS

The supplementary European search report dated May 31, 2023 from European patent application No. 21767801.0.
(Continued)

*Primary Examiner* — Quan Pham
(74) *Attorney, Agent, or Firm* — Quarles & Brady LLP

(57) ABSTRACT

Disclosed in the present application are an image acquisition method, an imaging apparatus, an electronic device, and a non-transitory computer-readable storage medium. The image acquisition method includes: controlling exposure of a pixel array; and performing an interpolation process on a first colored original image and a second colored original image according to a first panchromatic original image, and fusing an interpolated image and the first panchromatic original image to obtain a target image with same resolution as resolution of the pixel array.

20 Claims, 22 Drawing Sheets

(51) Int. Cl.
*G06T 5/92* (2024.01)
*H04N 23/741* (2023.01)

(56) References Cited

U.S. PATENT DOCUMENTS

| | | | |
|---|---|---|---|
| 2009/0268055 A1 | 10/2009 | Hamilton, Jr. et al. | |
| 2010/0245636 A1* | 9/2010 | Kumar | H04N 25/133 |
| | | | 348/E9.002 |
| 2011/0090378 A1* | 4/2011 | Wang | H04N 5/208 |
| | | | 348/E9.002 |
| 2014/0063300 A1 | 3/2014 | Lin et al. | |
| 2015/0029358 A1 | 1/2015 | Kaizu et al. | |
| 2019/0124281 A1 | 4/2019 | Mitsunaga et al. | |

FOREIGN PATENT DOCUMENTS

| | | |
|---|---|---|
| CN | 104170376 A | 11/2014 |
| CN | 105409205 A | 3/2016 |
| CN | 105578065 A | 5/2016 |
| CN | 107644885 A | 1/2018 |
| CN | 108200354 A | 6/2018 |
| CN | 110740272 A | 1/2020 |
| CN | 111405204 A | 7/2020 |

OTHER PUBLICATIONS

The Examination Report dated Mar. 18, 2024 from European patent application No. 21767801.0.
International Search Report and the Written Opinion dated Apr. 12, 2021 from the International Searching Authority Re. Application No. PCT/CN2021/073292.
The First Office Action dated Dec. 23, 2021 from Chinese patent Application No. 202010166269.2.
The Notice of Allowance dated May 17, 2022 from Chinese patent Application No. 202010166269.2.

* cited by examiner

IMAGE ACQUISITION METHOD, ELECTRONIC DEVICE, AND NON-TRANSITORY COMPUTER-READABLE STORAGE MEDIUM FOR OBTAINING A TARGET IMAGE WITH A SAME RESOLUTION AS RESOLUTION OF A PIXEL ARRAY

CROSS-REFERENCE TO RELATED APPLICATION

This application is a continuation of International Application No. PCT/CN2021/073292, filed on Jan. 22, 2021, which claims priority benefit to Chinese Patent Application No. 202010166269.2 filed on Mar. 11, 2020, the entire contents of which are hereby incorporated by reference in its entirety in this application.

FIELD OF DISCLOSURE

The present application relates to a field of imaging technology, and more specifically, to an image acquisition method, an electronic device, and a non-transitory computer-readable storage medium.

BACKGROUND

High dynamic range imaging techniques are usually obtained by controlling an image sensor in an imaging apparatus to perform long and short exposures, and then fuse images obtained by the long and short exposures. Fused images may better show details of dark areas and bright areas.

SUMMARY

Embodiments of the present application provide an image acquisition method, an electronic device, and a non-transitory computer-readable storage medium.

According to an embodiment of the present application, an image acquisition method is provided, which is applied to an image sensor. The image sensor includes a pixel array including a plurality of panchromatic photosensitive pixels and a plurality of color photosensitive pixels, and the color photosensitive pixels have a narrower spectral response than the panchromatic photosensitive pixels. The pixel array comprises minimal repeating units, each of the minimal repeating units comprises a plurality of subunits, and each of the subunits comprises a plurality of monochromatic photosensitive pixels and a plurality of panchromatic photosensitive pixels. The image acquisition method comprises: controlling exposure of the pixel array, wherein for a plurality of photosensitive pixels in a same subunit, at least one of the monochromatic photosensitive pixels is exposed for a first exposure time, and at least another one of the monochromatic photosensitive pixels is exposed for a second exposure time shorter than the first exposure time, and at least one of the panchromatic photosensitive pixels is exposed for a third exposure time shorter than the first exposure time; and performing an interpolation process on a first colored original image and a second colored original image according to a first panchromatic original image, and fusing an interpolated image and the first panchromatic original image to obtain a target image with a same resolution as resolution of the pixel array; wherein the first colored original image is obtained from first-color information generated by the monochromatic photosensitive pixels exposed for the first exposure time, and the second colored original image is obtained from second-color information generated by the monochromatic photosensitive pixels exposed for the second exposure time; and the first panchromatic original image is obtained from first panchromatic information generated by the panchromatic photosensitive pixels exposed for the third exposure time.

According to an embodiment of the present application, there is provided an electronic device including an image sensor, one or more processors, and a memory. The image sensor includes a pixel array. The pixel array includes a plurality of panchromatic photosensitive pixels and a plurality of color photosensitive pixels, and the color photosensitive pixels have a narrower spectral response than the panchromatic photosensitive pixels. The pixel array comprises minimal repeating units, each of the minimal repeating units comprises a plurality of subunits, and each of the subunits comprises a plurality of monochromatic photosensitive pixels and a plurality of panchromatic photosensitive pixels. The pixel array in the image sensor is exposed, wherein for a plurality of photosensitive pixels in a same subunit, at least one of the monochromatic photosensitive pixels is exposed for a first exposure time, and at least another one of the monochromatic photosensitive pixels is exposed for a second exposure time shorter than the first exposure time, and at least one of the panchromatic photosensitive pixels is exposed for a third exposure time shorter than the first exposure time. The memory is configured to store instructions which, when executed by the one or more processors, cause the one or more processors to perform an interpolation process on a first colored original image and a second colored original image according to a first panchromatic original image, and fuse an interpolated image and the first panchromatic original image to obtain a target image with a same resolution as resolution of the pixel array; wherein the first colored original image is obtained from first-color information generated by the monochromatic photosensitive pixels exposed for the first exposure time, and the second colored original image is obtained from second-color information generated by the monochromatic photosensitive pixels exposed for the second exposure time, and the first panchromatic original image is obtained from first panchromatic information generated by the panchromatic photosensitive pixels exposed for the third exposure time.

According to an embodiment of the present application, there is provided a non-transitory computer-readable storage medium having stored instructions that is executed by a processor of an electronic device, cause the processor of the electronic device to perform an interpolation process on a first colored original image and a second colored original image according to a first panchromatic original image, and fuse an interpolated image and the first panchromatic original image to obtain a target image with a same resolution as resolution of the pixel array; wherein the first colored original image is obtained from first-color information generated by the monochromatic photosensitive pixels exposed for the first exposure time, and the second colored original image is obtained from second-color information generated by the monochromatic photosensitive pixels exposed for the second exposure time, and the first panchromatic original image is obtained from first panchromatic information generated by the panchromatic photosensitive pixels exposed for the third exposure time.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF DRAWINGS

These and other aspects and advantages of embodiments of the present application will become apparent and more readily appreciated from the following descriptions made with reference to following drawings.

DETAILED DESCRIPTION

Figure 1:
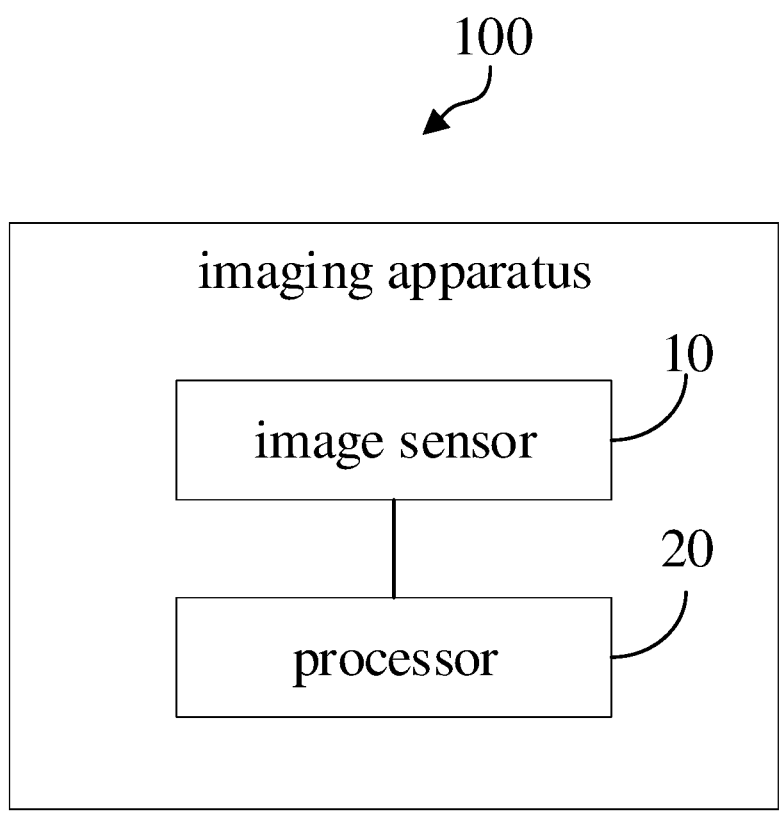
FIG. 1 is a schematic diagram of an imaging apparatus according to an embodiment of the present application.

Embodiments of the present application are described in detail below and examples of the embodiments are illustrated in the accompanying drawings, wherein same or similar labels throughout the present application represent corresponding same or similar elements or corresponding elements having same or similar functions. The description of the embodiments with reference to the accompanying drawings below is exemplary, aims at illustrating the present application, and cannot be considered as limitations to the present application.

An embodiment of the present application provides an acquisition method applied to an image sensor. The image sensor includes a pixel array, the pixel array includes a plurality of panchromatic photosensitive pixels and a plurality of color photosensitive pixels, the color photosensitive pixels have a narrower spectral response than the panchromatic photosensitive pixels. The pixel array includes minimal repeating units, each of the minimal repeating units includes a plurality of subunits, and each of the subunits includes a plurality of monochromatic photosensitive pixels and a plurality of panchromatic photosensitive pixels. The image acquisition method includes: controlling exposure of the pixel array, wherein, for a plurality of photosensitive pixels in a same subunit, at least one of the monochromatic photosensitive pixels is exposed for a first exposure time, and at least another one of the monochromatic photosensitive pixels is exposed for a second exposure time that is shorter than the first exposure time, and at least one of the panchromatic photosensitive pixels is exposed for a third exposure time that is shorter than the first exposure time; and performing an interpolation process on a first colored original image and a second colored original image according to a first panchromatic original image, and fusing an interpolated image and the first panchromatic original image to obtain a target image with a same resolution as resolution of the pixel array; wherein the first colored original image is obtained from first-color information generated by the monochromatic photosensitive pixels exposed for the first exposure time, and the second colored original image is obtained from second-color information generated by the monochromatic photosensitive pixels exposed for the second exposure time, and the first panchromatic original image is obtained from first panchromatic information generated by the panchromatic photosensitive pixels exposed for the third exposure time.

In some embodiments, all panchromatic photosensitive pixels are exposed for the third exposure time; the step of performing the interpolation process on the first colored original image and the second colored original image according to the first panchromatic original image and fusing the interpolated image and the first panchromatic original image to obtain the target image with the same resolution as the resolution of the pixel array includes: performing the interpolation process on the first colored original image to obtain a first colored intermediate image with resolution lower than the resolution of the pixel array, performing the interpolation process on the second colored original image to obtain a second colored intermediate image with resolution lower than the resolution of the pixel array; performing the interpolation process on the first panchromatic original image to obtain a first panchromatic intermediate image with resolution equal to the resolution of the pixel array; performing a brightness alignment process on the first colored intermediate image and the second colored intermediate image to obtain a brightness-aligned first colored intermediate image; fusing the brightness-aligned first colored intermediate image and the second colored intermediate image to obtain a colored initial merged image; performing the interpolation process on the colored initial merged image according to the first panchromatic intermediate image to obtain a colored intermediate merged image with the resolution equal to the resolution of the pixel array; and fusing the colored intermediate merged image and the first panchromatic intermediate image to obtain the target image.

In some embodiments, some panchromatic photosensitive pixels in a same subunit are exposed for a fourth exposure time, and remaining panchromatic photosensitive pixels are exposed for the third exposure time, and the fourth exposure time is shorter than or equal to the first exposure time and longer than the third exposure time; the step of performing the interpolation process on the first colored original image and the second colored original image according to the first panchromatic original image and fusing the interpolated image and the first panchromatic original image to obtain the target image with the same resolution as the resolution of the pixel array includes: performing the interpolation process on the first colored original image to obtain the first colored intermediate image with the resolution lower than the resolution of the pixel array, and performing the interpolation process on the second colored original image to obtain the second colored intermediate image with the resolution lower than the resolution of the pixel array; performing the interpolation process on the first panchromatic original image to obtain the first panchromatic intermediate image with the resolution equal to the resolution of the pixel array, and performing the interpolation process on a second panchromatic original image to obtain a second panchromatic intermediate image with the resolution equal to the resolution of the pixel array, wherein the second panchromatic original image is obtained from second panchromatic information generated by the panchromatic photosensitive pixels exposed for the fourth exposure time; performing the brightness alignment process on the first colored intermediate image and the second colored intermediate image to obtain the brightness-aligned first colored intermediate image; performing the brightness alignment process on the first panchromatic intermediate image and the second panchromatic intermediate image to obtain a brightness-aligned second panchromatic intermediate image; fusing the brightness-aligned first colored intermediate image and the second colored intermediate image to obtain the colored initial merged image; fusing the first panchromatic intermediate image and the brightness-aligned second panchromatic intermediate image to obtain a panchromatic merged image; performing the interpolation process on the colored initial merged image according to the panchromatic merged image to obtain the colored intermediate merged image with the resolution equal to the resolution of the pixel array; and fusing the colored intermediate merged image and the panchromatic merged image to obtain the target image.

In some embodiments, when all panchromatic photosensitive pixels are exposed for the third exposure time, an exposure duration of all monochromatic photosensitive pixels exposed for the second exposure time is within an exposure duration of all monochromatic photosensitive pixels exposed for the first exposure time, and an exposure duration of all panchromatic photosensitive pixels exposed for the third exposure time is within an exposure duration of all monochromatic photosensitive pixels exposed for the first exposure time. When the some panchromatic photosensitive pixels in the same subunit are exposed for the fourth exposure time, and the remaining panchromatic photosensitive pixels are exposed for the third exposure time, the exposure duration of all monochromatic photosensitive pixels exposed for the second exposure time is within the exposure duration of all monochromatic photosensitive pixels exposed for the first exposure time, and the exposure duration of all panchromatic photosensitive pixels exposed for the third exposure time is within the exposure duration of all monochromatic photosensitive pixels exposed for the first exposure time, and an exposure duration of all monochromatic photosensitive pixels exposed for the fourth exposure time is within the exposure duration of all monochromatic photosensitive pixels exposed for the first exposure time.

In some embodiments, the step of performing the brightness alignment process on the first colored intermediate image and the second colored intermediate image to obtain the brightness-aligned first colored intermediate image includes: identifying overexposed image pixels with pixel values greater than a first preset threshold in the first colored intermediate image; for each overexposed image pixel, expanding a preset area with the overexposed image pixel as a center; searching for intermediate image pixels with pixel values less than the first preset threshold in the preset area; correcting the pixel values of the overexposed image pixels by using the intermediate image pixels and the second colored intermediate image; and updating the first colored intermediate image with corrected pixel values of the overexposed image pixels to obtain a brightness-aligned first colored intermediate image.

In some embodiments, the step of performing the brightness alignment process on the first panchromatic intermediate image and the second panchromatic intermediate image to obtain the brightness-aligned second panchromatic intermediate image includes: identifying overexposed image pixels with pixel values greater than a second preset threshold in the second panchromatic intermediate image; for each overexposed image pixel, expanding a preset area with the overexposed image pixel as a center; searching for intermediate image pixels with pixel values less than the second preset threshold in the preset area; correcting the pixel values of the overexposed image pixels by using the intermediate image pixels and the first panchromatic intermediate image; and updating the second panchromatic intermediate image with corrected pixel values of the overexposed image pixels to obtain the brightness-aligned second panchromatic intermediate image.

In some embodiments, the step of fusing the brightness-aligned first colored intermediate image and the second colored intermediate image to obtain the colored initial merged image includes: performing a motion detection on the brightness-aligned first colored intermediate image; when there is no motion blurred area in the brightness-aligned first colored intermediate image, fusing the brightness-aligned first colored intermediate image and the second colored intermediate image to obtain the colored initial merged image; when there is a motion blurred area in the brightness-aligned first colored intermediate image, fusing areas of the brightness-aligned first colored intermediate image other than the motion blurred area and the second colored intermediate image to obtain the colored initial merged image.

In some embodiments, the step of fusing the first panchromatic intermediate image and the brightness-aligned second panchromatic intermediate image to obtain the panchromatic merged image includes: performing the motion detection on the brightness-aligned second panchromatic intermediate image; when there is no motion blurred area in the brightness-aligned second panchromatic intermediate image, fusing the first panchromatic intermediate image and the brightness-aligned second panchromatic intermediate image to obtain the panchromatic merged image; when there is a motion blurred area in the brightness-aligned second panchromatic intermediate image, fusing the first panchromatic intermediate image and areas of the brightness-aligned second panchromatic intermediate image other than the motion blurred area to obtain the panchromatic merged image.

An imaging apparatus of an embodiment of the present application includes an image sensor and a processor. The image sensor includes a pixel array, wherein the pixel array comprises a plurality of panchromatic photosensitive pixels and a plurality of color photosensitive pixels, and the color photosensitive pixels have a narrower spectral response than the panchromatic photosensitive pixels; the pixel array comprises minimal repeating units, each of the minimal repeating units comprises a plurality of subunits, and each of the subunits comprises a plurality of monochromatic photosensitive pixels and a plurality of panchromatic photosensitive pixels; the pixel array in the image sensor is exposed, wherein for a plurality of photosensitive pixels in a same subunit, at least one of the monochromatic photosensitive pixels is exposed for a first exposure time, and at least another one of the monochromatic photosensitive pixels is exposed for a second exposure time shorter than the first exposure time, and at least one of the panchromatic photosensitive pixels is exposed for a third exposure time shorter than the first exposure time. The processor is configured to perform interpolation process on a first colored original image and a second colored original image according to a first panchromatic original image, and fuse an interpolated image and the first panchromatic original image to obtain a target image with a same resolution as the solution of the pixel array, wherein the first colored original image is obtained from first-color information generated by the monochromatic photosensitive pixels exposed for the first exposure time, and the second colored original image is obtained from second-color information generated by the monochromatic photosensitive pixels exposed for the second exposure time, and the first panchromatic original image is obtained from first panchromatic information generated by the panchromatic photosensitive pixels exposed for the third exposure time.

In some embodiments, all panchromatic photosensitive pixels are exposed for the third exposure time; the processor is further configured to:

perform an interpolation process on the first colored original image to obtain a first colored intermediate image with resolution lower than resolution of the pixel array, and perform the interpolation process on the second colored original image to obtain a second colored intermediate image with resolution lower than the resolution of the pixel array; perform the interpolation process on the first panchromatic original image to obtain a first panchromatic intermediate image with resolution equal to the resolution of the pixel array; perform a brightness alignment process on the first colored intermediate image and the second colored intermediate image to obtain a brightness-aligned first colored intermediate image; fuse the brightness-aligned first colored intermediate image and the second colored intermediate image to obtain a colored initial merged image; perform the interpolation process on the colored initial merged image according to the first panchromatic intermediate image to obtain a colored intermediate merged image with the resolution equal to the resolution of the pixel array; and fuse the colored intermediate merged image and the first panchromatic intermediate image to obtain the target image.

In some embodiments, some panchromatic photosensitive pixels in a same subunit are exposed for a fourth exposure time, and the remaining panchromatic photosensitive pixels are exposed for the third exposure time, and the fourth exposure time is shorter than or equal to the first exposure time and longer than the third exposure time; the processor is further configured to: perform the interpolation process on the first colored original image to obtain the first colored intermediate image with the resolution lower than the resolution of the pixel array, and perform the interpolation process on the second colored original image to obtain the second colored intermediate image with the resolution lower than the resolution of the pixel array; perform the interpolation process on the first panchromatic original image to obtain the first panchromatic intermediate image with the resolution equal to the resolution of the pixel array, and perform the interpolation process on the second panchromatic original image to obtain the second panchromatic intermediate image with the resolution equal to the resolution of the pixel array; wherein the second panchromatic original image is obtained from second panchromatic information generated by the panchromatic photosensitive pixels exposed for the fourth exposure time; perform the brightness alignment process on the first colored intermediate image and the second colored intermediate image to obtain the brightness-aligned first colored intermediate image; perform the brightness alignment process on the first panchromatic intermediate image and the second panchromatic intermediate image to obtain a brightness-aligned second panchromatic intermediate image; fuse the brightness-aligned first colored intermediate image and the second colored intermediate image to obtain the colored initial merged image; fuse the first panchromatic intermediate image and the brightness-aligned second panchromatic intermediate image to obtain a panchromatic merged image; perform the interpolation process on the colored initial merged image according to the panchromatic merged image to obtain the colored intermediate merged image with the resolution equal to the resolution of the pixel array; and fuse the colored intermediate merged image and the panchromatic merged image to obtain the target image.

In some embodiments, when all panchromatic photosensitive pixels are exposed for the third exposure time, an exposure duration of all monochromatic photosensitive pixels exposed for the second exposure time is within an exposure duration of all monochromatic photosensitive pixels exposed for the first exposure time, and an exposure duration of all panchromatic photosensitive pixels exposed for the third exposure time is within the exposure duration of all monochromatic photosensitive pixels exposed for the first exposure time. When the some panchromatic photosensitive pixels in the same subunit are exposed for the fourth exposure time, and the remaining panchromatic photosensitive pixels are exposed for the third exposure time, the exposure duration of all monochromatic photosensitive pixels exposed for the second exposure time is within the exposure duration of all monochromatic photosensitive pixels exposed for the first exposure time, the exposure duration of all panchromatic photosensitive pixels exposed for the third exposure time is within the exposure duration of all monochromatic photosensitive pixels exposed for the first exposure time, an exposure duration of all monochromatic photosensitive pixels exposed for the fourth exposure time is within the exposure duration of all monochromatic photosensitive pixels exposed for the first exposure time.

In some embodiments, the processor is further configured to: identify overexposed image pixels with pixel values greater than a first preset threshold in the first colored intermediate image; for each overexposed image pixel, expand a preset area with the overexposed image pixel as a center; search for intermediate image pixels with pixel values less than the first preset threshold in the preset area; correct the pixel values of the overexposed image pixels by using the intermediate image pixels and the second colored intermediate image; and update the first colored intermediate image with corrected pixel values of the overexposed image pixels to obtain the brightness-aligned first colored intermediate image.

In some embodiments, the processor is further configured to: identify overexposed image pixels with pixel values greater than a second preset threshold in the second panchromatic intermediate image; for each overexposed image pixel, expand a preset area with the overexposed image pixel as a center; search for intermediate image pixels with pixel values less than the second preset threshold in the preset area; correct the pixel values of the overexposed image pixels by using the intermediate image pixels and the first panchromatic intermediate image; and update the second panchromatic intermediate image with the corrected pixel values of the overexposed image pixels to obtain the brightness-aligned second panchromatic intermediate image.

In some embodiments, the processor is further configured to: perform a motion detection on the brightness-aligned first colored intermediate image; when there is no motion blurred area in the brightness-aligned first colored intermediate image, fuse the brightness-aligned first colored intermediate image and the second colored intermediate image to obtain the colored initial merged image; when there is a motion blurred area in the brightness-aligned first colored intermediate image, fuse areas of the brightness-aligned first colored intermediate image other than the motion blurred area and the second colored intermediate image to obtain the colored initial merged image.

In some embodiments, the processor is further configured to: perform the motion detection on the brightness-aligned second panchromatic intermediate image; when there is no motion blurred area in the brightness-aligned second panchromatic intermediate image, fuse the first panchromatic intermediate image and the brightness-aligned second panchromatic intermediate image to obtain the panchromatic merged image; when there is a motion blurred area in the brightness-aligned second panchromatic intermediate image, fuse the first panchromatic intermediate image and areas of the brightness-aligned second panchromatic intermediate image other than the motion blurred area to obtain the panchromatic merged image.

In some embodiments, the pixel array is arranged in a two-dimensional matrix; for any two adjacent rows of photosensitive pixels, there is at least one row of the photosensitive pixels satisfying a condition that control terminals of exposure control circuits of the plurality of monochromatic photosensitive pixels located in a same row are connected to a first exposure control line, and control terminals of exposure control circuits of the plurality of panchromatic photosensitive pixels are connected to a second exposure control line, and control terminals of reset circuits of the plurality of monochromatic photosensitive pixels and the plurality of panchromatic photosensitive pixels located in the same row are connected to a reset line; or for any two adjacent rows of the photosensitive pixels, there is at least one row of the photosensitive pixels satisfying a condition that the control terminals of the reset circuits of the plurality of monochromatic photosensitive pixels located in a same row are connected to a first reset line, and control terminals of reset circuits of the plurality of panchromatic photosensitive pixels are connected to a second reset line, and the control terminals of the exposure control circuits of the plurality of monochromatic photosensitive pixels and the plurality of panchromatic photosensitive pixels located in the same row are connected to an exposure control line; or for any two adjacent rows of the photosensitive pixels, there is at least one row of the photosensitive pixels satisfying a condition that the control terminals of the exposure control circuits of the plurality of monochromatic photosensitive pixels located in a same row are connected to the first exposure control line, and the control terminals of the exposure control circuits of the plurality of panchromatic photosensitive pixels are connected to the second exposure control line, and the control terminals of the reset circuits of the plurality of monochromatic photosensitive pixels are connected to the first reset line, and the control terminals of the reset circuits of the plurality of panchromatic photosensitive pixels are connected to the second reset line.

In some embodiments, an arrangement of the minimal repeating units is:

| W | A | W | B |
|---|---|---|---|
| A | W | B | W |
| W | B | W | C |
| B | W | C | W |

W represents the panchromatic photosensitive pixel; A represents a first-color photosensitive pixel in the plurality of color photosensitive pixels; B represents a second-color photosensitive pixel in the plurality of color photosensitive pixels; C represents a third-color photosensitive pixel in the plurality of color photosensitive pixels.

An electronic device according to an embodiment of the present application includes a housing and the imaging apparatus of any of the above-described embodiments. The imaging apparatus is combined with the housing.

A non-transitory computer-readable storage medium contains a computer program of embodiments of the present application, and the computer program, when executed by a processor, causes the processor to execute the image acquisition method of any of the foregoing embodiments.

In the related art, a control unit in an image sensor can control a plurality of photoelectric conversion elements covered by a same filter to perform exposures of different durations respectively, so as to obtain multiple frames of colored original images with different exposure durations. The processor fuses multiple colored original images to obtain a high dynamic range image. However, an implementation of such high dynamic range image reduces resolution of the high dynamic range image and affects sharpness of imaging of the image sensor.

For the above reasons, please refer to FIG. 1 to FIG. 3, and FIG. 5, the present application provides an imaging apparatus 100. The imaging apparatus 100 includes an image sensor 10 and a processor 20. The image sensor 10 includes a pixel array 11. The pixel array 11 includes a plurality of panchromatic photosensitive pixels W and a plurality of color photosensitive pixels. The pixel array 11 includes minimal repeating units, and each minimal repeating unit includes a plurality of subunits. Each subunit includes a plurality of monochromatic photosensitive pixels and a plurality of panchromatic photosensitive pixels W. The pixel array 11 in the image sensor 10 is exposed. Wherein, for the plurality of photosensitive pixels 110 in a same subunit, at least one of the monochromatic photosensitive pixels is exposed for a first exposure time, and at least another one of the monochromatic photosensitive pixels is exposed for a second exposure time that is shorter than the first exposure time, and at least one of the panchromatic photosensitive pixels is exposed for a third exposure time that is shorter than the first exposure time. The processor 20 is electrically connected to the image sensor 10. The processor 10 is configured to perform an interpolation process on the first colored original image and the second colored original image according to the first panchromatic original image, and fuse an interpolated image and the first panchromatic original image to obtain an target image with a same resolution as resolution of the pixel array; wherein the first colored original image is obtained from first-color information generated by the monochromatic photosensitive pixels exposed for the first exposure time, and the second colored original image is obtained from second-color information generated by the monochromatic photosensitive pixels exposed for the second exposure time, and the first panchromatic original image is obtained from first panchromatic information generated by the panchromatic photosensitive pixels exposed for the third exposure time.

The imaging apparatus 100 of the embodiment of the present application acquires a target image with a high dynamic range by controlling the plurality of photosensitive pixels 110 in each subunit in the pixel array 11 to expose for different exposure durations. In addition, the imaging apparatus performs the interpolation process on the first colored original image and the second colored original image in a process of acquiring the target image with the high dynamic range, so that a finally obtained target image may have a same resolution as the resolution of the pixel array 11. Moreover, the interpolation process of the first colored original image and the second colored original image is performed based on information in the first panchromatic original image, and thus an interpolation result is more accurate, and a color reproduction effect is better.

The imaging apparatus 100 according to the embodiment of the present application will be described in detail below with reference to the accompanying drawings.

Figure 2:
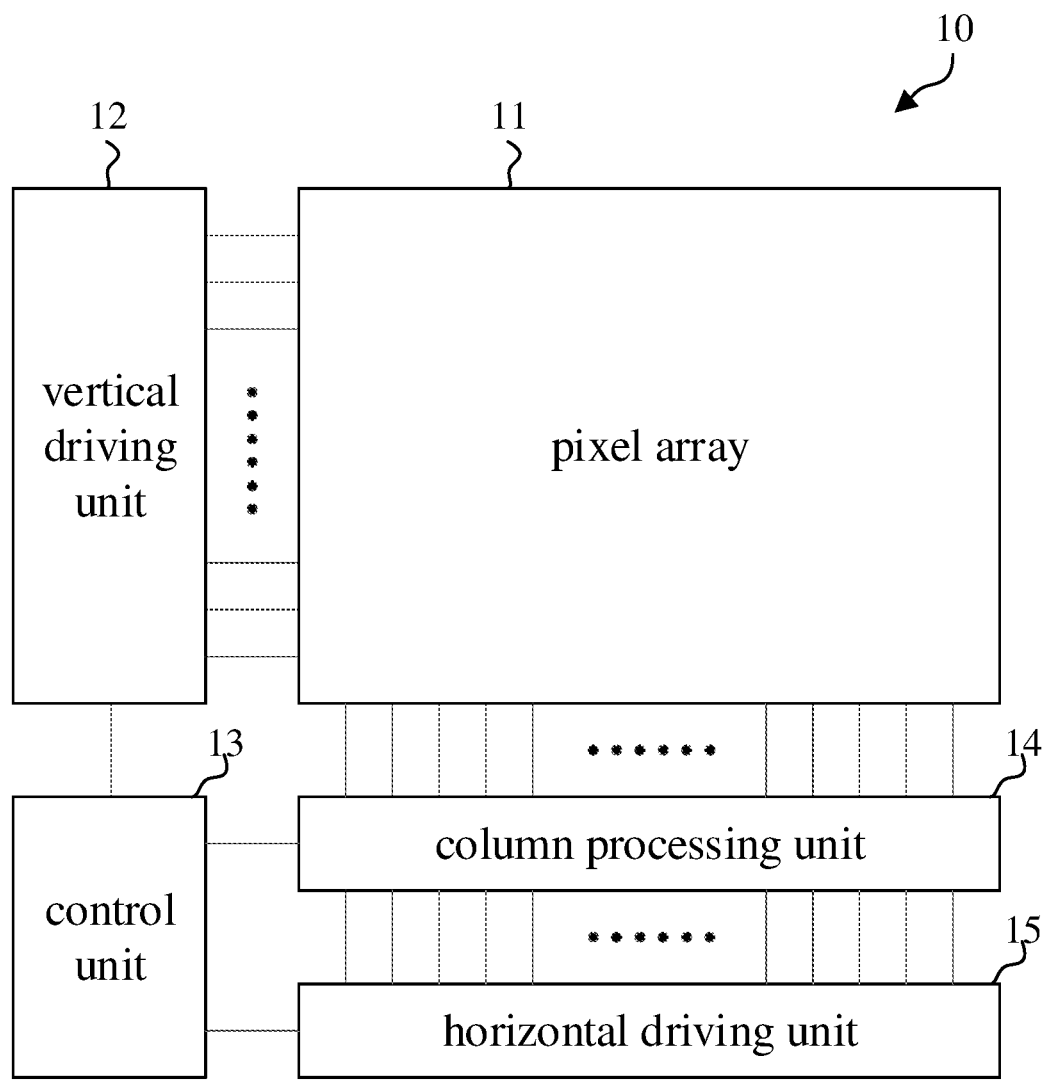
FIG. 2 is a schematic diagram of a pixel array according to an embodiment of the present application.

FIG. 2 is a schematic diagram of the image sensor 10 in an embodiment of the present application. The image sensor 10 includes a pixel array 11, a vertical driving unit 12, a control unit 13, a column processing unit 14, and a horizontal driving unit 15.

For example, the image sensor 10 may use a complementary metal oxide semiconductor (CMOS) photosensitive element or a charge coupled device (CCD) photosensitive element.

Figure 3:
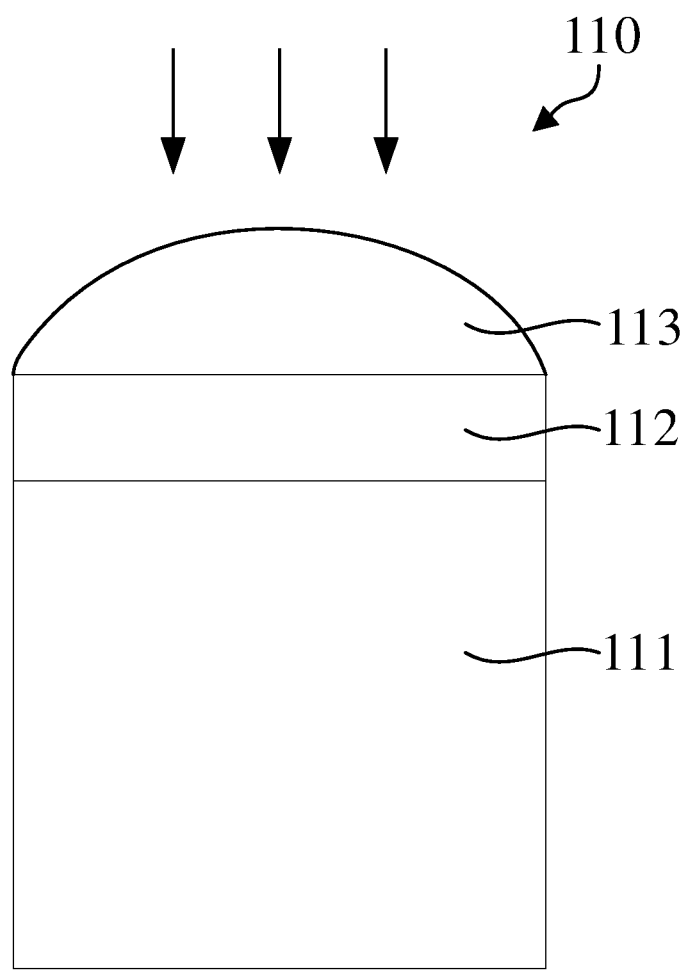
FIG. 3 is a schematic cross-sectional view of a photosensitive pixel according to an embodiment of the present application.
Figure 4:
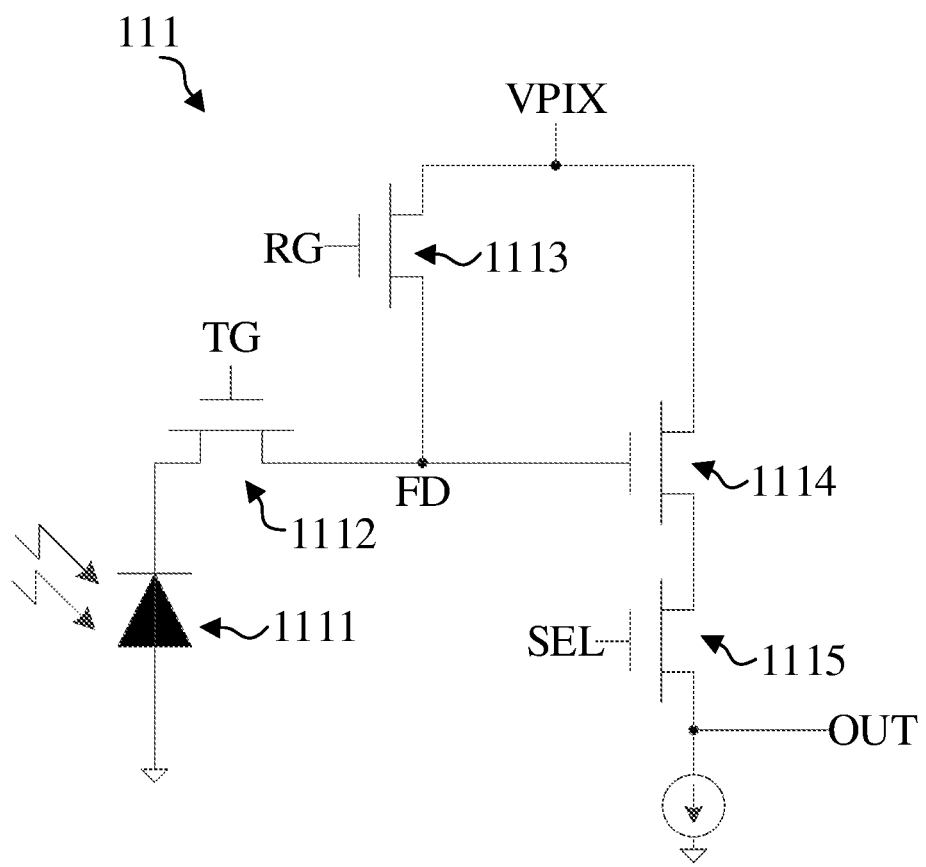
FIG. 4 is a pixel circuit diagram of the photosensitive pixel according to an embodiment of the present application.

For example, the pixel array 11 includes a plurality of photosensitive pixels 110 (shown in FIG. 3) arranged two-dimensionally in an array form (i.e., arranged in a two-dimensional matrix form), and each photosensitive pixel 110 includes a photoelectric conversion element 1111 (shown in FIG. 4). Each photosensitive pixel 110 converts light into electric charge according to intensity of light incident thereon.

For example, the vertical driving unit 12 includes a shift register and an address decoder. The vertical driving unit 12 includes readout scan and reset scan functions. The readout scan refers to sequentially scanning photosensitive pixels 110 row by row and reading signals from these photosensitive pixels 110 row by row. For example, a signal output by each photosensitive pixel 110 in a selected and scanned photosensitive pixel row is transmitted to the column processing unit 14. The reset scan is used to reset charges, and photoelectric charges of the photoelectric conversion element are discarded, so that accumulation of new photoelectric charges can begin.

For example, a signal processing performed by the column processing unit 14 is correlated double sampling (CDS) processing. In the CDS processing, a reset level and a signal level output from each photosensitive pixel 110 in the selected photosensitive pixel row are taken out, and a level difference is calculated therefrom. Thus, signals of the photosensitive pixels 110 in one row are obtained. The column processing unit 14 may have an analog-to-digital (A/D) conversion function for converting an analog pixel signal into a digital format.

For example, the horizontal driving unit 15 includes a shift register and an address decoder. The horizontal driving unit 15 sequentially scans the pixel array 11 column by column. Through a selective scanning operation performed by the horizontal driving unit 15, each photosensitive pixel column is processed sequentially and output sequentially by the column processing unit 14.

For example, the control unit 13 configures timing signals according to an operation mode, and uses various timing signals to control the vertical driving unit 12, the column processing unit 14, and the horizontal driving unit 15 to work together.

FIG. 3 is a schematic diagram of a photosensitive pixel 110 in an embodiment of the present application. The photosensitive pixel 110 includes a pixel circuit 111, a filter 112, and a microlens 113, wherein the microlens 113, the filter 112, and the pixel circuit 111 are arranged in sequence along a light-receiving direction of the photosensitive pixel 110. The microlens 113 is configured to condense light, and the filter 112 is configured to pass light of a certain wavelength band and filter out light of other wavelength bands. The pixel circuit 111 is configured to convert received light into an electrical signal, and to provide a generated electrical signal to the column processing unit 14 shown in FIG. 2.

FIG. 4 is a schematic diagram of a pixel circuit 111 of the photosensitive pixel 110 in an embodiment of the present application. The pixel circuit 111 in FIG. 4 may be applied to each photosensitive pixel 110 (shown in FIG. 3) in the pixel array 11 shown in FIG. 2. A working principle of the pixel circuit 111 will be described below with reference to FIGS. 2 to 4.

As shown in FIG. 4, the pixel circuit 111 includes a photoelectric conversion element 1111 (e.g., a photodiode), an exposure control circuit (e.g., a transfer transistor 1112), a reset circuit (e.g., a reset transistor 1113), an amplifier circuit (e.g., an amplifying transistor 1114), and a selection circuit (e.g., a selection transistor 1115). In the embodiment of the present application, the transfer transistor 1112, the reset transistor 1113, the amplifying transistor 1114, and the selection transistor 1115 are, for example, MOS transistors, but are not limited thereto.

For example, the photoelectric conversion element 1111 includes a photodiode. An anode of the photodiode is connected to, for example, the ground, and the photodiode converts received light into electrical charges, and a cathode of the photodiode is connected to a floating diffusion unit FD via the exposure control circuit (e.g., the transfer transistor 1112). The floating diffusion unit FD is connected to a gate of the amplifier transistor 1114 and a source of the reset transistor 1113.

For example, the exposure control circuit is the transfer transistor 1112, and a control terminal TG of the exposure control circuit is a gate of the transfer transistor 1112. When a pulse of a valid level (e.g., VPIX level) is transmitted to the gate of the transfer transistor 1112 through the exposure control line (e.g., TX shown in FIG. 17), the transfer transistor 1112 is turned on. The transfer transistor 1112 transfers the charges photoelectrically converted by the photodiode to the floating diffusion unit FD.

For example, a drain of the reset transistor 1113 is connected to the pixel power supply VPIX. A source of the reset transistor 1113 is connected to the floating diffusion unit FD. Before charges are transferred from the photodiode to the floating diffusion unit FD, a pulse of a valid reset level is transmitted to a gate of the reset transistor 1113 via the reset line (e.g., RX shown in FIG. 17), and the reset transistor 1113 is turned on. The reset transistor 1113 resets the floating diffusion unit FD to the pixel power supply VPIX.

For example, a gate of the amplifying transistor 1114 is connected to the floating diffusion unit FD. A drain of the amplifying transistor 1114 is connected to the pixel power supply VPIX. After the floating diffusion unit FD is reset by the reset transistor 1113, the amplifying transistor 1114 outputs a reset level through an output terminal OUT via the selection transistor 1115. After the charges of the photodiode are transferred by the transfer transistor 1112, the amplifying transistor 1114 outputs the signal level through the output terminal OUT via the selection transistor 1115.

For example, a drain of the selection transistor 1115 is connected to a source of the amplifying transistor 1114. A source of the select transistor 1115 is connected to the column processing unit 14 in FIG. 2 through the output terminal OUT. When the pulse of the valid level is transmitted to a gate of the selection transistor 1115 through a selection line, the selection transistor 1115 is turned on. The signal output by the amplifying transistor 1114 is transmitted to the column processing unit 14 through the selection transistor 1115.

It should be noted that a pixel structure of the pixel circuit 111 in the embodiment of the present application is not limited to the structure shown in FIG. 4. For example, the pixel circuit 111 may also have a three-transistor pixel structure, in which the functions of the amplifying transistor 1114 and the selection transistor 1115 are performed by one transistor. For example, the exposure control circuit is not limited to a mode of a single transfer transistor 1112, and another electronic devices or structures with a function of controlling a conduction of a control terminal may be used as the exposure control circuit in the embodiments of the present application. The implementation of the single transfer transistor 1112 is simple, low-cost, and easy to control.

FIG. 5 to FIG. 10 are schematic diagrams of an arrangement of the photosensitive pixels 110 (shown in FIG. 3) in the pixel array 11 (shown in FIG. 2) according to some embodiments of the present application. The photosensitive pixels 110 include two types, one is a panchromatic photosensitive pixel W, and another one is a color photosensitive pixel. FIG. 5 to FIG. 10 only show the arrangement of a plurality of photosensitive pixels 110 in one minimal repeating unit. The pixel array 11 may be formed by duplicating the minimal repeating unit shown in FIG. 5 to FIG. 10 multiple times on rows and columns. Each minimal repeating unit is composed of a plurality of the panchromatic photosensitive pixels W and a plurality of the color photosensitive pixels. The minimal repeating unit includes multiple subunits. Each subunit includes a plurality of monochromatic photosensitive pixels and the plurality of panchromatic photosensitive pixels W. The color photosensitive pixel refers to a photosensitive pixel that can receive light from a color channel, and the plurality of color photosensitive pixels include a plurality of types of monochromatic photosensitive pixels, and different types of monochromatic photosensitive pixels receive light from different color channels. It should be noted that a monochromatic photosensitive pixel may only receive light from a color channel of a monochromatic color, and may also receive light from color channels of two or even more colors, which is not limited herein. Wherein, in the minimal repeating unit shown in FIG. 5 to FIG. 8, the panchromatic photosensitive pixels W and the color photosensitive pixels in each subunit are alternately arranged. In the minimal repeating unit shown in FIG. 9 and FIG. 10, in each subunit, the plurality of photosensitive pixels 110 in a same row are photosensitive pixels 110 of a same type; or the plurality of photosensitive pixels 110 in a same column are photosensitive pixels 110 of a same type.

Figure 5:
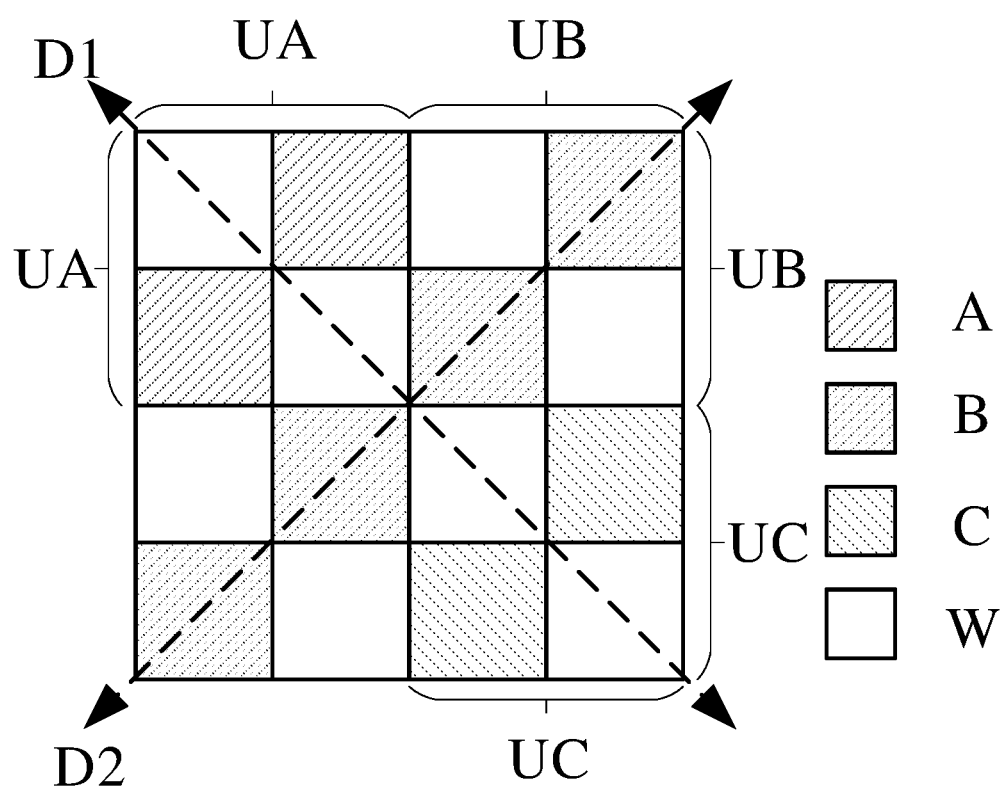
FIG. 5 to FIG. 10 are schematic diagrams of arrangements of a minimal repeating unit in the pixel array according to embodiments of the present application.

Specifically, for example, FIG. 5 is a schematic diagram of the arrangement of the photosensitive pixels 110 (shown in FIG. 3) in the minimal repeating unit according to an embodiment of the present application. The minimal repeating unit is 16 photosensitive pixels 110 in 4 rows and 4 columns, and the subunit is 4 photosensitive pixels 110 in 2 rows and 2 columns. The arrangement is as follows:

| W | A | W | B |
| A | W | B | W |
| W | B | W | C |
| B | W | C | W |

W represents the panchromatic photosensitive pixel; A represents the first-color photosensitive pixel in the plurality of color photosensitive pixels; B represents the second-color photosensitive pixel in the plurality of color photosensitive pixels; C represents the third-color photosensitive pixel in the plurality of color photosensitive pixels.

For example, as shown in FIG. 5, for each subunit, the panchromatic photosensitive pixels W and the monochromatic photosensitive pixels are alternately arranged.

For example, as shown in FIG. 5, categories of subunits include three categories. Wherein a first-type subunit UA includes a plurality of panchromatic photosensitive pixels W and a plurality of first-color photosensitive pixels A; a second-type subunit UB includes a plurality of panchromatic photosensitive pixels W and a plurality of second-color photosensitive pixels B; and a third-type subunit UC includes a plurality of panchromatic photosensitive pixels W and a plurality of third-color photosensitive pixels C. Each minimal repeating unit includes four subunits, which are one first-type subunit UA, two second-type subunits UB, and one third-type subunit UC, respectively. Wherein the one first-type subunit UA and the one third-type subunit UC are arranged in a first diagonal direction D1 (for example, a direction connecting an upper left corner and a lower right corner in FIG. 5), and the two second-type subunits UB are arranged in a second diagonal direction D2 (e.g., a direction connecting an upper right corner and a lower left corner in FIG. 5). The first diagonal direction D1 is different from the second diagonal direction D2. For example, a first diagonal and a second diagonal are perpendicular.

It should be noted that, in other embodiments, the first diagonal direction D1 may also be the direction connecting the upper right corner and the lower left corner, and the second diagonal direction D2 may also be the direction connecting the upper left corner and the lower right corner. In addition, the "direction" here is not a single direction, but can be understood as a concept of a "straight line" indicating the arrangement, and there may be bidirectional directions at both ends of a straight line. The explanation of the first diagonal direction D1 and the second diagonal direction D2 in FIG. 6 to FIG. 10 below is same as here.

Figure 6:
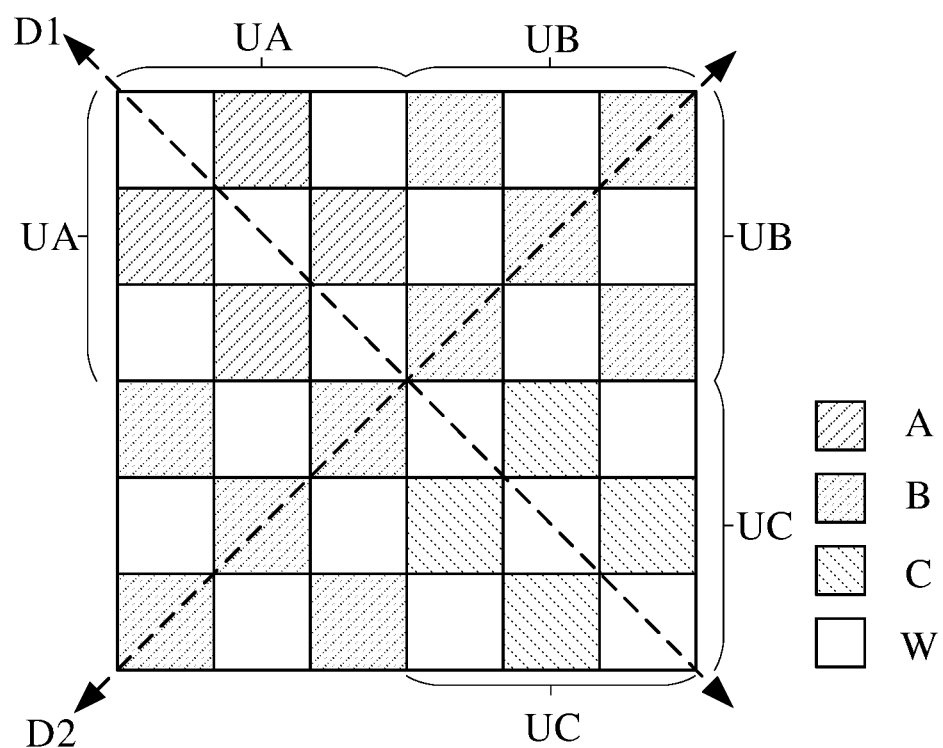

For another example, FIG. 6 is a schematic diagram of the arrangement of the photosensitive pixels 110 (shown in FIG. 3) in the minimal repeating unit according to another embodiment of the present application. The minimal repeating unit is 36 photosensitive pixels 110 in 6 rows and 6 columns, and the subunit is 9 photosensitive pixels 110 in 3 rows and 3 columns. The arrangement is as follows:

| W | A | W | B | W | B |
| A | W | A | W | B | W |
| W | A | W | B | W | B |
| B | W | B | W | C | W |
| W | B | W | C | W | C |
| B | W | B | W | C | W |

W represents the panchromatic photosensitive pixel; A represents the first-color photosensitive pixel in the plurality of color photosensitive pixels; B represents the second-color photosensitive pixel in the plurality of color photosensitive pixels; C represents the third-color photosensitive pixel in the plurality of color photosensitive pixels.

For example, as shown in FIG. 6, for each subunit, the panchromatic photosensitive pixels W and the monochromatic photosensitive pixels are alternately arranged.

For example, as shown in FIG. 6, the categories of subunits include three categories. Wherein the first-type subunit UA includes the plurality of panchromatic photosensitive pixels W and the plurality of first-color photosensitive pixels A; the second-type subunit UB includes the plurality of panchromatic photosensitive pixels W and the plurality of second-color photosensitive pixels B; and the third-type subunit UC includes the plurality of panchromatic photosensitive pixels W and the plurality of third-color photosensitive pixels C. Each minimal repeating unit includes four subunits, which are one first-type subunit UA, two second-type subunits UB, and one third-type subunit UC, respectively. Wherein the one first-type subunit UA and the one third-type subunit UC are arranged in the first diagonal direction D1, and the two second-type subunits UB are arranged in the second diagonal direction D2. The first diagonal direction D1 is different from the second diagonal direction D2. For example, the first diagonal and the second diagonal are perpendicular.

Figure 7:
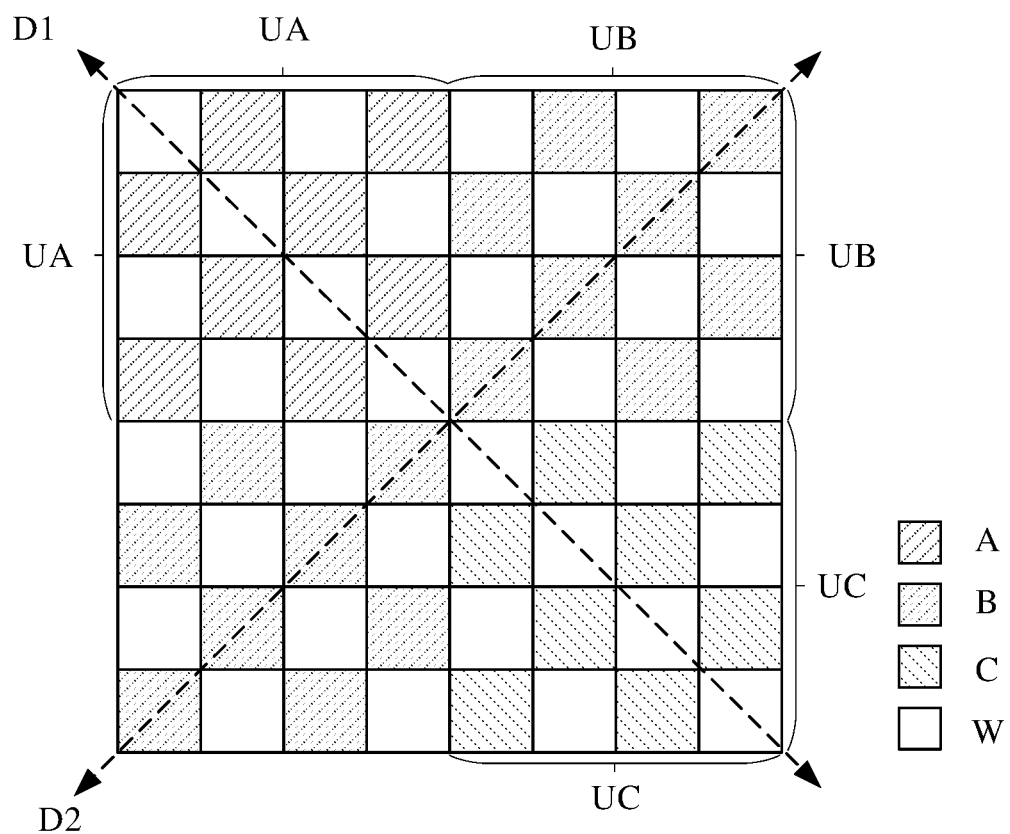

For another example, FIG. 7 is a schematic diagram of the arrangement of the photosensitive pixels 110 (shown in FIG. 3) in the minimal repeating unit according to still another embodiment of the present application. The minimal repeating unit is 64 photosensitive pixels 110 in 8 rows and 8 columns, and the subunit is 16 photosensitive pixels 110 in 4 rows and 4 columns. The arrangement is as follows:

| W | A | W | A | W | B | W | B |
| A | W | A | W | B | W | B | W |
| W | A | W | A | W | B | W | B |
| A | W | A | W | B | W | B | W |
| W | B | W | B | W | C | W | C |
| B | W | B | W | C | W | C | W |
| W | B | W | B | W | C | W | C |
| B | W | B | W | C | W | C | W |

W represents the panchromatic photosensitive pixel; A represents the first-color photosensitive pixel in the plurality of color photosensitive pixels; B represents the second-color photosensitive pixel in the plurality of color photosensitive pixels; C represents the third-color photosensitive pixel in the plurality of color photosensitive pixels.

For example, as shown in FIG. 7, for each subunit, the panchromatic photosensitive pixels W and the monochromatic photosensitive pixels are alternately arranged.

For example, as shown in FIG. 7, the categories of subunits include three categories. Wherein the first-type subunit UA includes the plurality of panchromatic photosensitive pixels W and the plurality of first-color photosensitive pixels A; the second-type subunit UB includes the plurality of panchromatic photosensitive pixels W and the plurality of second-color photosensitive pixels B; and the third-type subunit UC includes the plurality of panchromatic photosensitive pixels W and the plurality of third-color photosensitive pixels C. Each minimal repeating unit includes four subunits, which are one first-type subunit UA, two second-type subunits UB, and one third-type subunit UC, respectively. Wherein the one first-type subunit UA and the one third-type subunit UC are arranged in the first diagonal direction D1, and the two second-type subunits UB are arranged in the second diagonal direction D2. The first diagonal direction D1 is different from the second diagonal direction D2. For example, the first diagonal and the second diagonal are perpendicular.

Figure 8:
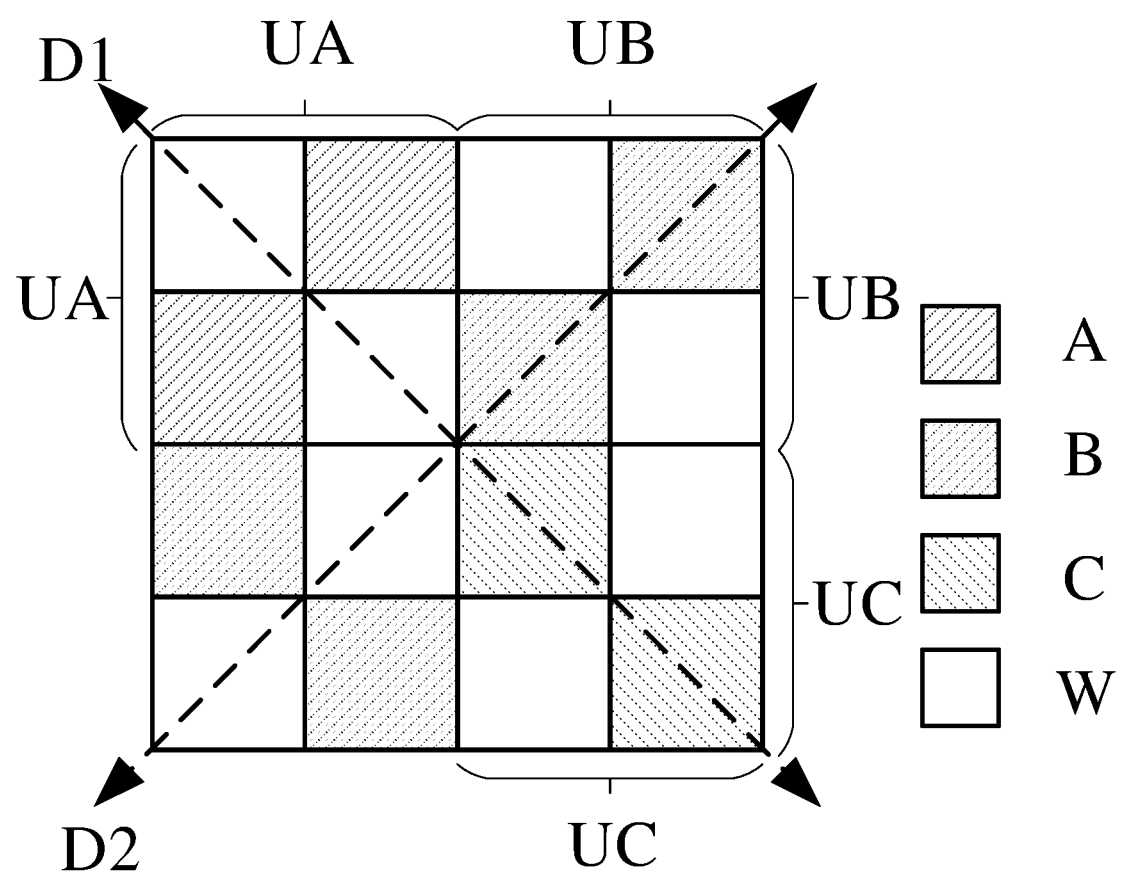

Specifically, for example, FIG. 8 is a schematic diagram of the arrangement of photosensitive pixels 110 (shown in FIG. 3) in minimal repeating units according to still another embodiment of the present application. The minimal repeating unit is 16 photosensitive pixels 110 in 4 rows and 4 columns, and the subunit is 4 photosensitive pixels 110 in 2 rows and 2 columns. The arrangement is as follows:

| W | A | W | B |
| A | W | B | W |
| B | W | C | W |
| W | B | W | C |

W represents the panchromatic photosensitive pixel; A represents the first-color photosensitive pixel in the plurality of color photosensitive pixels; B represents the second-color photosensitive pixel in the plurality of color photosensitive pixels; C represents the third-color photosensitive pixel in the plurality of color photosensitive pixels.

The arrangement of the photosensitive pixels 110 in the minimal repeating unit shown in FIG. 8 is substantially same as the arrangement of the photosensitive pixels 110 in the minimal repeating unit shown in FIG. 5, and differences therebetween are that an alternating sequence of the panchromatic photosensitive pixel W and the monochromatic photosensitive pixel in the second-type subunit UB located in the lower left corner in FIG. 8 is inconsistent with an alternating sequence of the panchromatic photosensitive pixel W and the monochromatic photosensitive pixel in the second-type subunit UB located in the lower left corner in FIG. 5, and an alternating sequence of the panchromatic photosensitive pixel W and the monochromatic photosensitive pixel in the third-type subunit UC in the lower right corner in FIG. 8 is inconsistent with an alternating sequence of the panchromatic photosensitive pixel W and the monochromatic photosensitive pixel in the third-type subunit UC located in the lower right corner in FIG. 5. Specifically, in the second-type subunit UB located in the lower left corner of FIG. 5, the alternating sequence of the photosensitive pixels 110 in a first row is the panchromatic photosensitive pixel W and the monochromatic photosensitive pixel (i.e., the second-color photosensitive pixel B), and the alternating sequence of the photosensitive pixels 110 in a second row is the monochromatic photosensitive pixel (i.e., the second-color photosensitive pixel B) and the panchromatic photosensitive pixel W. While in the second-type subunit UB located in the lower left corner of FIG. 8, the alternating sequence of the photosensitive pixels 110 in a first row is the monochromatic photosensitive pixel (i.e., the second-color photosensitive pixel B) and the panchromatic photosensitive pixel W, and the alternating sequence of the photosensitive pixels 110 in a second row is the panchromatic photosensitive pixel W and the monochromatic photosensitive pixel (i.e., the second-color photosensitive pixel B). In the third-type subunit UC located in the lower right corner of FIG. 5, the alternating sequence of the photosensitive pixels 110 in a first row is the panchromatic photosensitive pixel W and the monochromatic photosensitive pixel (i.e., the third-color photosensitive pixel C), and the alternating sequence of the photosensitive pixels 110 in a second row is the monochromatic photosensitive pixel (i.e., the third-color photosensitive pixel C) and the panchromatic photosensitive pixel W.

In the third-type subunit UC located in the lower right corner in FIG. 8, the alternating sequence of the photosensitive pixels 110 in a first row is the monochromatic photosensitive pixel (i.e., the third-color photosensitive pixel C) and the panchromatic photosensitive pixel W, and the alternating sequence of the photosensitive pixels 110 in a second row is the panchromatic photosensitive pixel W and the monochromatic photosensitive pixel (i.e., the third-color photosensitive pixel C).

As shown in FIG. 8, the alternating sequence of the panchromatic photosensitive pixel W and the monochromatic photosensitive pixel in the first-type subunit UA is inconsistent with the alternating sequence of the panchromatic photosensitive pixel W and the monochromatic photosensitive pixel in the third-type subunit UC in FIG. 8. Specifically, in the first-type subunit UA shown in FIG. 8, the alternating sequence of the photosensitive pixels 110 in the first row is the panchromatic photosensitive pixel W and the monochromatic photosensitive pixel (i.e., the first-color photosensitive pixel A), and the alternating sequence of the photosensitive pixels 110 in the second row is the monochromatic photosensitive pixel (i.e., the first-color photosensitive pixel A) and the panchromatic photosensitive pixel W; while in the third-type subunit UC shown in FIG. 8, the alternating sequence of the photosensitive pixels 110 in the first row is the monochromatic photosensitive pixel (i.e., the third-color photosensitive pixel C) and the panchromatic photosensitive pixel W, and the alternating sequence of the photosensitive pixels 110 in the second row is the panchromatic photosensitive pixel W and the monochromatic photosensitive pixel (i.e., the third-color photosensitive pixel C). That is to say, in a same minimal repeating unit, the alternating sequence of the panchromatic photosensitive pixel W and the color photosensitive pixel in different subunits may be consistent (as shown in FIG. 5) or inconsistent (as shown in FIG. 8).

Figure 9:
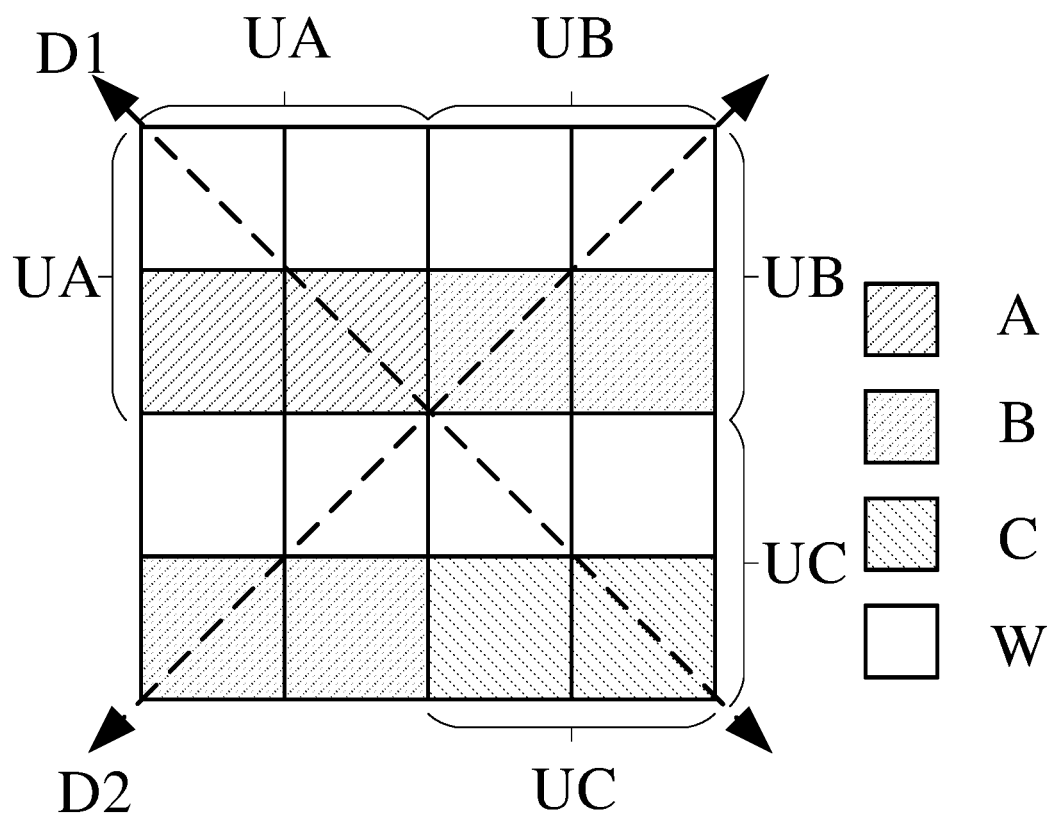

For another example, FIG. 9 is a schematic diagram of the arrangement of the photosensitive pixels 110 (shown in FIG. 3) in the minimal repeating unit according to still another embodiment of the present application. The minimal repeating unit is 16 photosensitive pixels 110 in 4 rows and 4 columns, and the subunit is 4 photosensitive pixels 110 in 2 rows and 2 columns. The arrangement is as follows:

| W | W | W | W |
|---|---|---|---|
| A | A | B | B |
| W | W | W | W |
| B | B | C | C |

W represents the panchromatic photosensitive pixel; A represents the first-color photosensitive pixel in the plurality of color photosensitive pixels; B represents the second-color photosensitive pixel in the plurality of color photosensitive pixels; C represents the third-color photosensitive pixel in the plurality of color photosensitive pixels.

For example, as shown in FIG. 9, for each subunit, the plurality of photosensitive pixels 110 in a same row are photosensitive pixels 110 of a same type. Wherein the photosensitive pixels 110 of the same type include: (1) both the panchromatic photosensitive pixel W; (2) both the first-color photosensitive pixel A; (3) both the second-color photosensitive pixel B; (4) both the third-color photosensitive pixel C.

For example, as shown in FIG. 9, the categories of subunits include three categories. Wherein the first-type subunit UA includes the plurality of panchromatic photosensitive pixels W and the plurality of first-color photosensitive pixels A; the second-type subunit UB includes the plurality of panchromatic photosensitive pixels W and the plurality of second-color photosensitive pixels B; and the third-type subunit UC includes the plurality of panchromatic photosensitive pixels W and the plurality of third-color photosensitive pixels C. Each minimal repeating unit includes four subunits, which are one first-type subunit UA, two second-type subunits UB, and one third-type subunit UC, respectively. Wherein the one first type subunit UA and the one third-type subunit UC are arranged in the first diagonal direction D1, and the two second-type subunits UB are arranged in the second diagonal direction D2. The first diagonal direction D1 is different from the second diagonal direction D2. For example, the first diagonal and the second diagonal are perpendicular.

Figure 10:
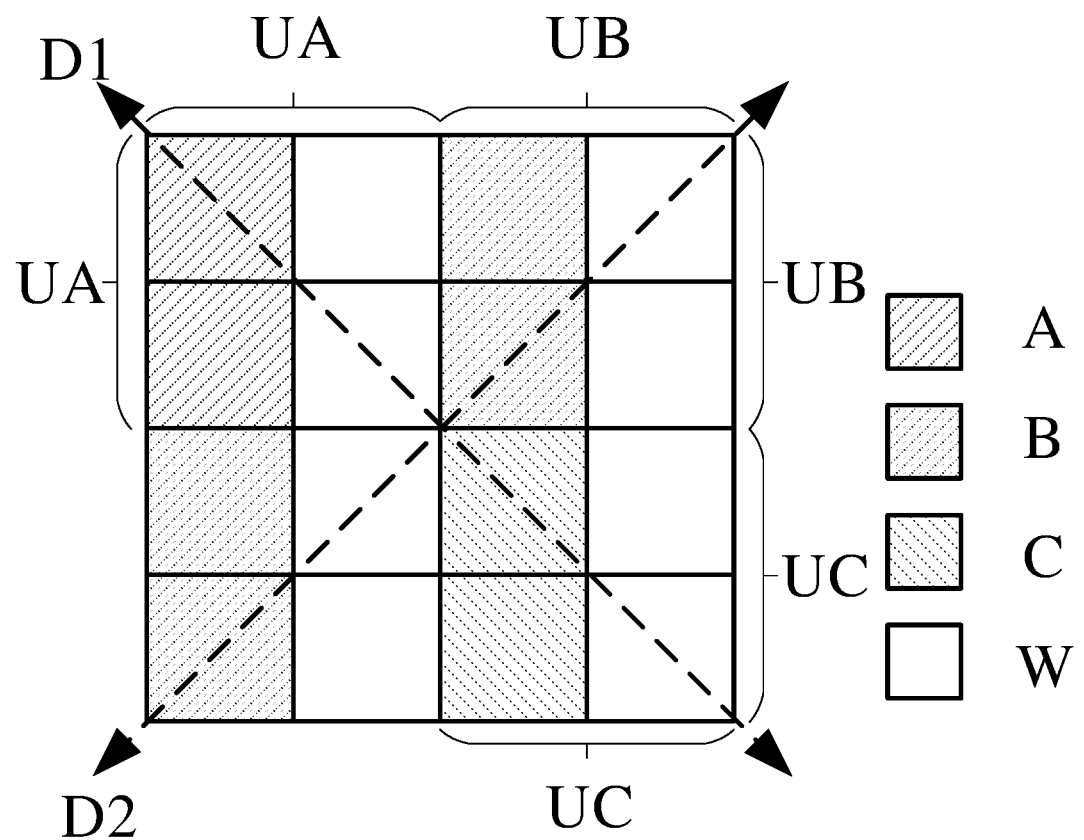

For another example, FIG. 10 is a schematic diagram of the arrangement of the photosensitive pixels 110 (shown in FIG. 3) in the minimal repeating unit according to still another embodiment of the present application. The minimal repeating unit is 16 photosensitive pixels 110 in 4 rows and 4 columns, and the subunit is 4 photosensitive pixels 110 in 2 rows and 2 columns. The arrangement is as follows:

| W | W | W | W |
|---|---|---|---|
| A | A | B | B |
| W | W | W | W |
| B | B | C | C |

W represents the panchromatic photosensitive pixel; A represents the first-color photosensitive pixel in the plurality of color photosensitive pixels; B represents the second-color photosensitive pixel in the plurality of color photosensitive pixels; C represents the third-color photosensitive pixel in the plurality of color photosensitive pixels.

For example, as shown in FIG. 10, for each subunit, a plurality of photosensitive pixels 110 in a same column are photosensitive pixels 110 of a same type. Wherein the photosensitive pixels 110 of the same type include: (1) both the panchromatic photosensitive pixel W; (2) both the first-color photosensitive pixel A; (3) both second-color photosensitive pixel B; (4) both the third-color photosensitive pixel C.

For example, as shown in FIG. 10, the categories of subunits include three categories. Wherein the first-type subunit UA includes the plurality of panchromatic photosensitive pixels W and the plurality of first-color photosensitive pixels A; the second-type subunit UB includes the plurality of panchromatic photosensitive pixels W and the plurality of second-color photosensitive pixels B; and the third-type subunit UC includes the plurality of panchromatic photosensitive pixels W and the plurality of third-color photosensitive pixels C. Each minimal repeating unit includes four subunits, which are one first-type subunit UA, two second-type subunits UB, and one third-type subunit UC, respectively. Wherein the one first type subunit UA and the one third type subunit UC are arranged in the first diagonal direction D1, and the two second type subunits UB are arranged in the second diagonal direction D2. The first diagonal direction D1 is different from the second diagonal direction D2. For example, the first diagonal and the second diagonal are perpendicular.

For example, in other embodiments, in a same minimal repeating unit, the plurality of photosensitive pixels 110 in a same row in some subunits are photosensitive pixels 110 of a same type, and the plurality of photosensitive pixels 110 in a same column in remaining subunits are photosensitive pixels 110 of a same type.

For example, in the minimal repeating unit shown in FIG. 5 to FIG. 10, the first-color photosensitive pixel A may be a red photosensitive pixel R; the second-color photosensitive pixel B may be a green photosensitive pixel G; and the third-color photosensitive pixel C may be a blue photosensitive pixel Bu.

For example, in the minimal repeating unit shown in FIG. 5 to FIG. 10, the first-color photosensitive pixel A may be the red photosensitive pixel R; the second-color photosensitive pixel B may be a yellow photosensitive pixel Y; and the third-color photosensitive pixel C may be the blue photosensitive pixel Bu.

For example, in the minimal repeating unit shown in FIG. 5 to FIG. 10, the first-color photosensitive pixel A may be a magenta photosensitive pixel M; the second-color photosensitive pixel B may be a cyan photosensitive pixel Cy; and the third-color photosensitive pixel C may be the yellow photosensitive pixel Y.

It should be noted that, in some embodiments, a response band of the panchromatic photosensitive pixel W may be a visible light band (e.g., 400 nm-760 nm). For example, the panchromatic photosensitive pixel W is provided with an infrared filter, so as to realize filtering of infrared light. In other embodiments, the response band of the panchromatic photosensitive pixel W is the visible light band and a near-infrared band (for example, 400 nm-1000 nm), which matches a response band of the photoelectric conversion element 1111 (shown in FIG. 4) in the image sensor 10 (shown in FIG. 1). For example, the panchromatic photosensitive pixel W may not be provided with a filter or may be provided with a filter that allows all wavelengths of light to pass through, and a response band of the panchromatic photosensitive pixel W is determined by a response band of the photoelectric conversion element 1111, that is, the two match each other. The embodiments of the present application include, but are not limited to, the above-mentioned band ranges.

Please refer to FIG. 1 to FIG. 3 and FIG. 5, in some embodiments, the control unit 13 controls the exposure of the pixel array 11. Wherein, for the plurality of photosensitive pixels 110 in the same subunit, at least one of the monochromatic photosensitive pixels is exposed for the first exposure time, at least another one of the monochromatic photosensitive pixels is exposed for the second exposure time that is shorter than the first exposure time, and at least one of the panchromatic photosensitive pixels W is exposed for the third exposure time that is shorter than the first exposure time. In the pixel array 11, a plurality of first-color information can be generated by the plurality of monochromatic photosensitive pixels exposed for the first exposure time, and a plurality of second-color information can be generated by the plurality of monochromatic photosensitive pixels exposed for the second exposure time, and a plurality of first panchromatic information can be generated by the plurality of panchromatic photosensitive pixels W (shown in FIG. 5) exposed for the third exposure time. The plurality of first-color information may form a first colored original image, and the plurality of second-color information may form a second colored original image, and the plurality of first panchromatic information may form a first panchromatic original image. The processor 20 in the imaging apparatus 100 may perform an interpolation process on the first colored original image and the second colored original image according to the first panchromatic original image, and fuse the interpolated image and the first panchromatic original image to obtain the target image with a same resolution as resolution of the pixel array 11.

The following describes a process of obtaining the target image with high resolution and a high dynamic range by the imaging apparatus 100 in conjunction with two embodiments.

Figure 11:
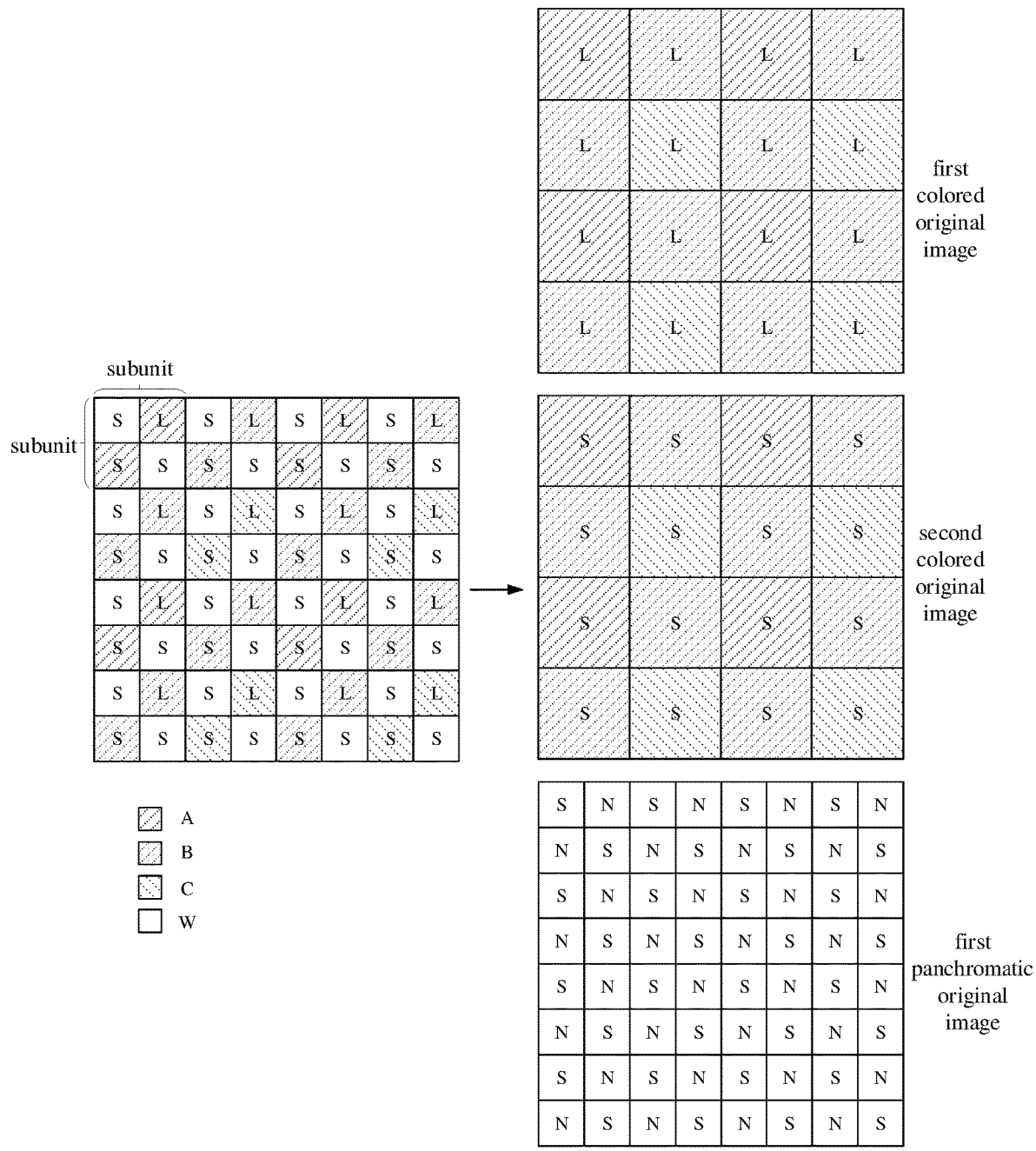
FIG. 11 to FIG. 16 are schematic diagrams of principles of processing an original image acquired by an image sensor by a processor in the imaging apparatus according to some embodiments of the present application.
Figure 12:
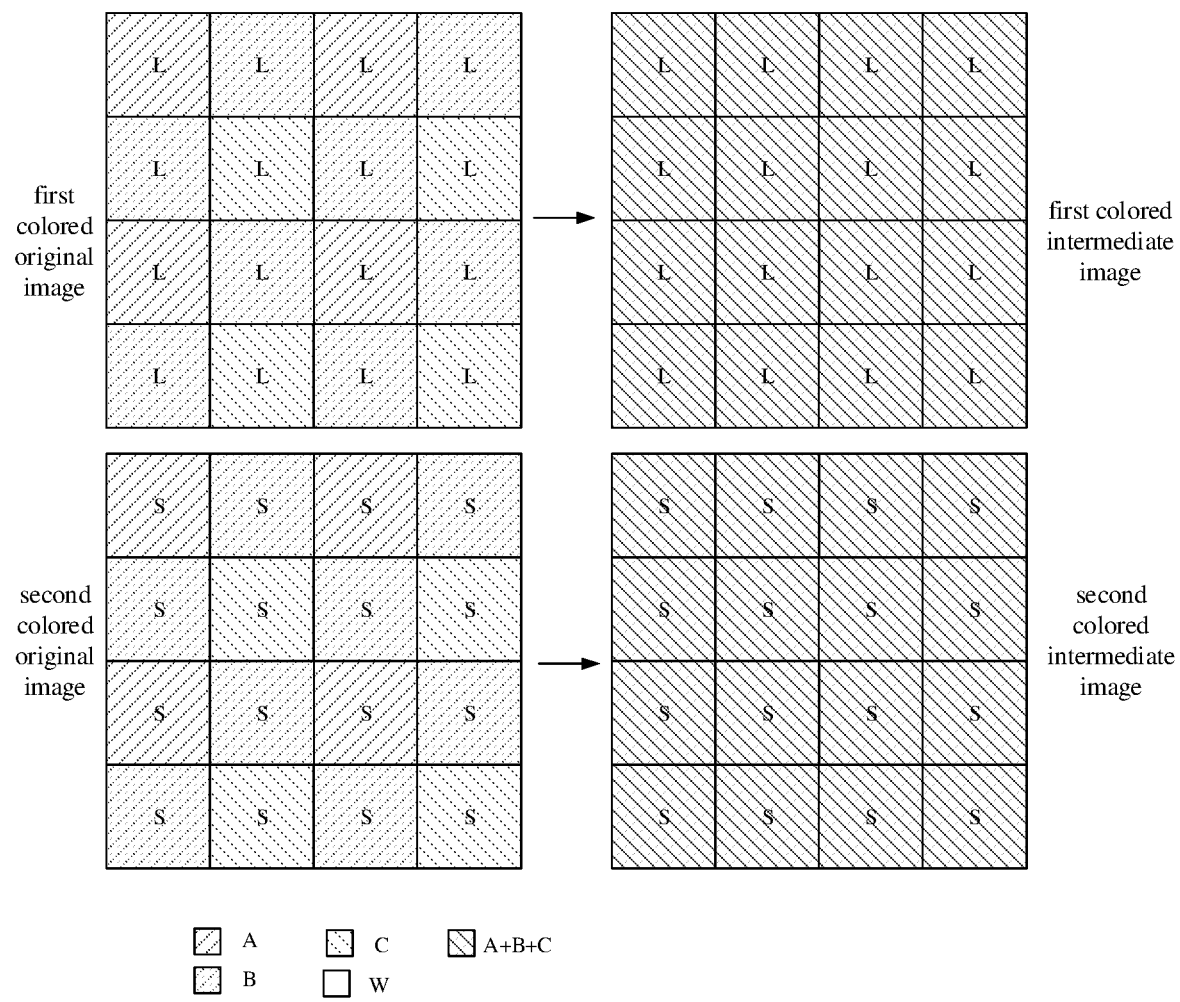

In one example, as shown in FIG. 1 to FIG. 3 and FIG. 11, all the panchromatic photosensitive pixels W in the pixel array 11 are exposed for the third exposure time. Specifically, for a plurality of (four as shown in FIG. 11) photosensitive pixels 110 in each subunit, one monochromatic photosensitive pixel is exposed for a first exposure time (e.g., a long exposure duration L shown in FIG. 11), and another one monochromatic photosensitive pixel is exposed for the second exposure time (e.g., a short exposure duration S shown in FIG. 11), and two panchromatic photosensitive pixels W are exposed for the third exposure time (e.g., a short exposure duration S shown in FIG. 11).

It should be noted that, in some embodiments, an exposure process of the pixel array 11 may be: (1) the photosensitive pixels 110 exposed for the first exposure time, the photosensitive pixels 110 exposed for the second exposure time, and the photosensitive pixels 110 exposed for the third exposure time are exposed in sequence (an exposure sequence of the three is not limited), and exposure durations of the three do not overlap; (2) the photosensitive pixels 110 exposed for the first exposure time, the photosensitive pixels 110 exposed for the second exposure time, and the photosensitive pixels 110 exposed for the third exposure time are exposed in sequence (the exposure sequence of the three is not limited), and the exposure durations of the three are partially overlapped; (3) the exposure duration of all photosensitive pixels 110 exposed for a shorter exposure duration is within the exposure duration of the photosensitive pixels 110 exposed for a longest exposure duration, for example, the exposure duration of all monochromatic photosensitive pixels exposed for the second exposure time is within the exposure duration of all monochromatic photosensitive pixels exposed for the first exposure time, and the exposure duration of all panchromatic photosensitive pixels W exposed for the third exposure time is within the exposure duration of all monochromatic photosensitive pixels exposed for the first exposure time. In a specific embodiment of the present application, the imaging apparatus 100 adopts an exposure method (3), the use of the exposure method reduces an overall exposure duration required by the pixel array 11 and facilitates an increase in a frame rate of the image.

After the exposure of the pixel array 11 is completed, the image sensor 10 can output three original images, which are: (1) one first colored original image, which is composed of the first-color information generated by the plurality of monochromatic photosensitive pixels exposed for the long exposure duration L; (2) one second colored original image, which is composed of the second-color information generated by the plurality of monochromatic photosensitive pixels exposed for the short exposure duration S; (3) one first panchromatic original image, which is composed of the first panchromatic information generated by the plurality of panchromatic photosensitive pixels W exposed for the short exposure duration S.

As shown in FIG. 1 to FIG. 3 and FIG. 12, after obtaining the first colored original image, the second colored original image, and the first panchromatic original image, the image sensor 10 transmits these three original images to the processor 20, so that the processor 20 performs subsequent processing on these three original images. Specifically, the processor 20 may perform the interpolation process on the first colored original image to obtain a first colored intermediate image with resolution lower than the resolution of the pixel array 11, and perform the interpolation process on the second colored original image to obtain a second colored intermediate image with resolution lower than the resolution of the pixel array 11. Wherein the interpolation process performed by the processor 20 on the first colored original image refers to compensating for a value of a color channel lacking in each image pixel in the first colored original image, so that each image pixel in an interpolated first colored intermediate image has values of all color channels. Taking the image pixel in the upper left corner of the first colored original image shown in FIG. 12 as an example, the image pixel has the value of the first-color channel (i.e., A), but lacks the value of the second-color channel (i.e., B) and the value of the third-color channel (i.e., C). The processor 20 can calculate the value of the second-color channel and the value of the third-color channel of the image pixel through the interpolation process, and fuse the value of the first-color channel, the value of the second-color channel, and the value of the third-color channel to obtain a value of the upper left image pixel in the first colored intermediate image; and the value of the image pixel consists of the values of these three colored channels, i.e., A+B+C. Similarly, the interpolation process performed by the processor 20 on the second colored original image refers to compensating for the value of the color channel lacking in each image pixel in the second colored original image, so that each image pixel in an interpolated second colored intermediate image has the values of all color channels. It should be noted that, A+B+C shown in FIG. 12 only indicates that the value of each image pixel is composed of the values of three color channels, and does not indicate that the values of the three color channels are directly added.

Figure 13:
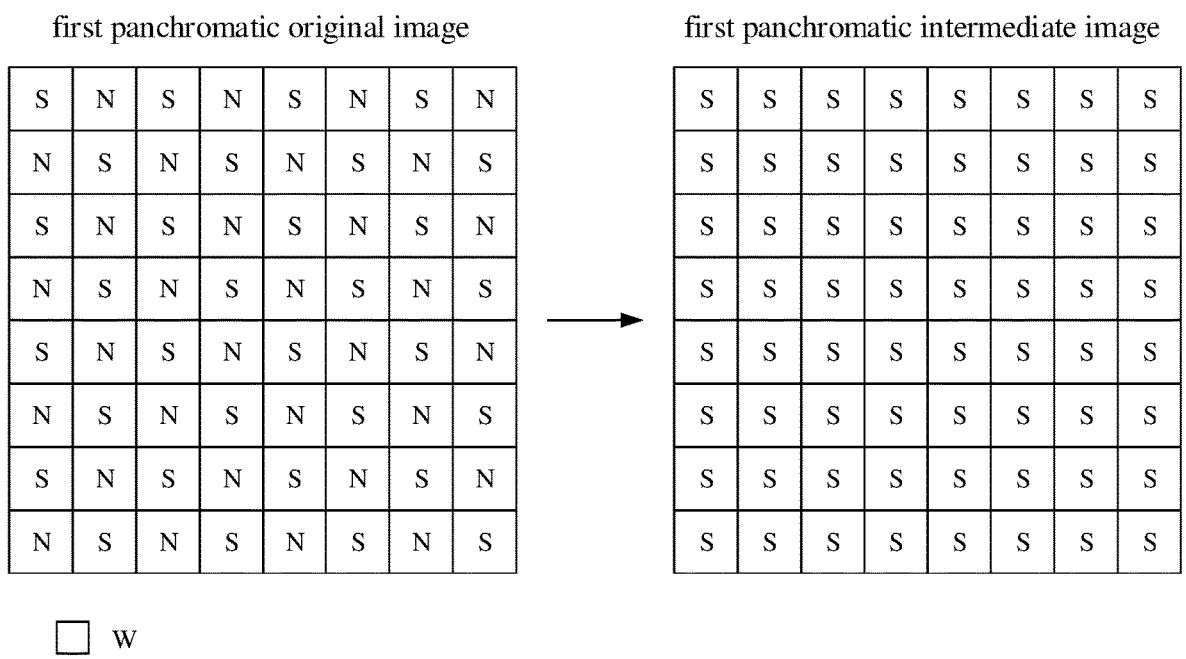

The processor 20 may also perform the interpolation process on the first panchromatic original image to obtain a first panchromatic intermediate image with the resolution equal to the resolution of the pixel array 11. As shown in FIG. 13, the first panchromatic original image includes image pixels with pixel values (image pixels marked with S in the first panchromatic original image) and image pixels without pixel values (image pixels marked with N, i.e., NULL in the first panchromatic original image). Each subunit of the first panchromatic original image includes two image pixels marked with S and two image pixels marked with N. Positions of the two image pixels marked with S correspond to positions of two panchromatic photosensitive pixels W in corresponding subunits in the pixel array 11, and positions of the two image pixels marked with N correspond to positions of two monochromatic photosensitive pixels in the corresponding subunits in the pixel array 11. The interpolation process performed by the processor 20 on the first panchromatic original image refers to calculating the pixel value of each image pixel marked with N in the first panchromatic original image, so that each image pixel in an interpolated first panchromatic intermediate image has a value of W color channel.

Figure 14:
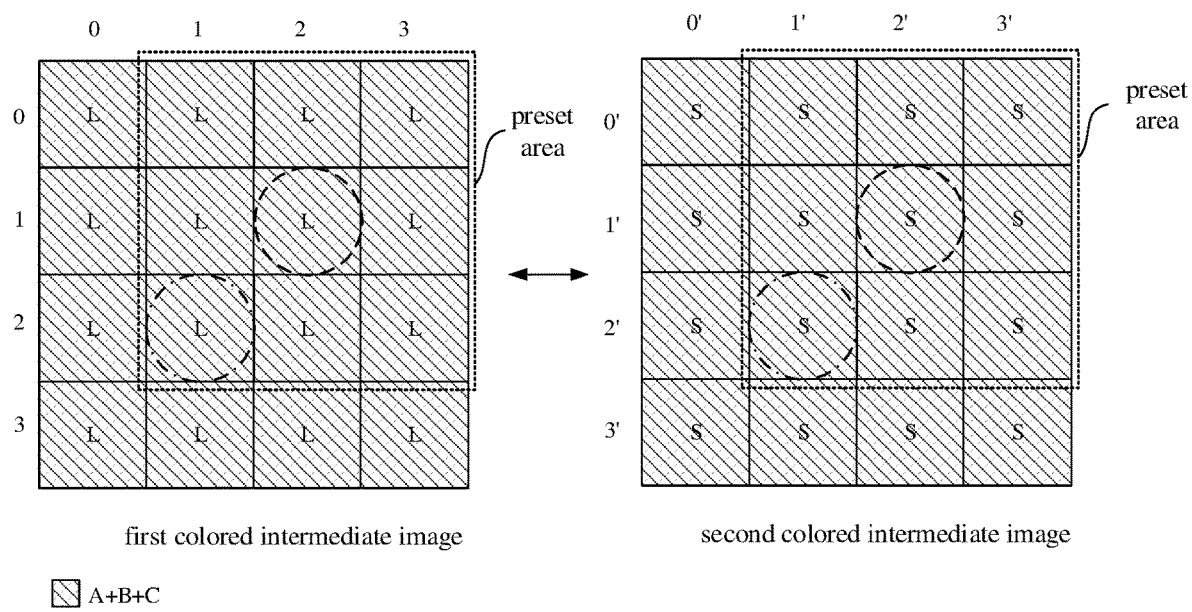

After the processor 20 obtains the first colored intermediate image and the second colored intermediate image, the processor 20 may perform a brightness alignment process on the first colored intermediate image and the second colored intermediate image to obtain a brightness-aligned first colored intermediate image. The brightness alignment process mainly includes following implementation processes. The processor 20 first identifies overexposed image pixels with pixel values greater than a first preset threshold in the first colored intermediate image. Then, for each overexposed image pixel, the processor 20 expands a preset area with the overexposed image pixel as the center. Then, the processor 20 searches for intermediate image pixels with pixel values less than the first preset threshold in the preset area, and corrects the pixel values of the overexposed image pixels by using the intermediate image pixels and the second colored intermediate image. Finally, the processor 20 updates the first colored intermediate image with corrected pixel values of the overexposed image pixels to obtain the brightness-aligned first colored intermediate image. Specifically, referring to FIG. 1 and FIG. 14, it is assumed that a pixel value V1 of an image pixel P12 (image pixels marked with a dashed circle in the first colored intermediate image in FIG. 14) is greater than the first preset threshold V0, that is, the image pixel P12 is an overexposed image pixel P12, the processor 20 expands a preset area with the overexposed image pixel P12 as a center. For example, a 3*3 area shown in FIG. 14, certainly, in other embodiments, the area may also be a 4*4 area, a 5*5 area, a 10*10 area, etc., which is not limited here. Subsequently, the processor 20 searches for intermediate image pixels with pixel values less than the first preset threshold V0 in the preset area of 3*3, for example, a pixel value V2 of an image pixel P21 (image pixels marked with a dotted circle in the first colored intermediate image in FIG. 14) in FIG. 14 is less than the first preset threshold V0, and the image pixel P21 is an intermediate image pixel P21. Then, the processor 20 respectively searches for image pixels corresponding to the overexposed image pixel P12 and the intermediate image pixel P21, that is, the image pixel P1'2' (image pixels marked with a dashed circle in the second colored intermediate image in FIG. 14) and image pixel P2'1' (image pixels marked with a dotted circle in the second colored intermediate image in FIG. 14) in the second colored intermediate image; wherein the image pixel P1'2' corresponds to the overexposed image pixel P12, and the image pixel P2'1' corresponds to the intermediate image pixel P21; the pixel value of the image pixel P1'2' is V3, and the pixel value of the image pixel P2'1' is V4. Then, the processor calculates V1' according to an equation V1'/V3=V2/V4, and replaces the value of V1 with the value of V1'. Thus, an actual pixel value of the overexposed image pixel P12 can be calculated. The processor 20 performs the brightness alignment process on each overexposed image pixel in the first colored intermediate image, so as to obtain a brightness-aligned first colored intermediate image. Since the pixel values of the overexposed image pixels in the brightness-aligned first colored intermediate image are corrected, the pixel value of each image pixel in the brightness-aligned first colored intermediate image is relatively accurate. It should be noted that there may be a plurality of image pixels with pixel values less than the first preset threshold in the preset area expanded with the overexposed image pixels as the center. Generally, an average value of a ratio of a long pixel value to a short pixel value of a plurality of image pixels in an area is constant, wherein the ratio of the long pixel value to the short pixel value of an image pixel refers to a ratio between a pixel value (i.e., a long exposure pixel value) of the image pixel corresponding to the first exposure time and a pixel value (i.e., a short exposure pixel value) of the image pixel corresponding to the second exposure time. Therefore, the processor 20 can arbitrarily select one image pixel from the plurality of image pixels as the intermediate image pixel, and calculate an actual pixel value of the overexposed image pixel based on the intermediate image pixel and the second colored original image.

After acquiring the brightness-aligned first colored intermediate image and the second colored intermediate image, the processor 20 may fuse the brightness-aligned first colored intermediate image and the second colored intermediate image to obtain a colored initial merged image. Specifically, the processor 20 first performs a motion detection on the brightness-aligned first colored intermediate image to identify whether there is a motion blurred area in the brightness-aligned first colored intermediate image. If there is no motion blurred area in the brightness-aligned first colored intermediate image, the brightness-aligned first colored intermediate image and the second colored intermediate image are directly fused to obtain the colored initial merged image. If there is a motion blurred area in the brightness-aligned first colored intermediate image, the motion blurred area in the first colored intermediate image is removed, and only all areas of the second colored intermediate image and areas of the brightness-aligned first colored intermediate image other than the motion blurred area are fused to obtain the colored initial merged image. Resolution of the colored initial merged image is lower than the resolution of the pixel array 11. Specifically, when fusing the brightness-aligned first colored intermediate image and the second colored intermediate image, if there is no motion blurred area in the brightness-aligned first colored intermediate image, the fusion of two intermediate images follows following principles: (1) in the brightness-aligned first colored intermediate image, a pixel value of an image pixel in an overexposed area is directly replaced with a pixel value of an image pixel corresponding to the overexposed area in the second colored intermediate image; (2) in the brightness-aligned first colored intermediate image, a pixel value of an image pixel in an underexposed area is: a long exposure pixel value divided by the ratio of the long pixel value to the short pixel value; (3) in the brightness-aligned first colored intermediate image, a pixel value of an image pixel in a neither underexposed nor overexposed area is: the long exposure pixel value divided by the ratio of the long pixel value to the short pixel value. If there is a motion blurred area in the brightness-aligned first colored intermediate image, in addition to following the above three principles, the fusion of the two intermediate images also needs to follow a fourth principle: in the brightness-aligned first colored intermediate image, a pixel value of an image pixel in the motion blurred area is directly replaced with a pixel value of an image pixel corresponding to the motion blurred area in the second colored intermediate image. It should be noted that for the underexposed area and the neither underexposed nor overexposed area, a pixel value of an image pixel in these areas is a value of the long exposure pixel value divided by the ratio of long pixel value to short pixel value, namely VL/(VL/VS)=VS', where VL represents the long exposure pixel value, VS represents the short exposure pixel value, and VS' represents a calculated pixel value of the image pixels in the underexposed area and the neither underexposed and nor overexposed area. A signal-to-noise ratio (SNR) of VS' will be greater than a signal-to-noise ratio of VS.

Figure 15:
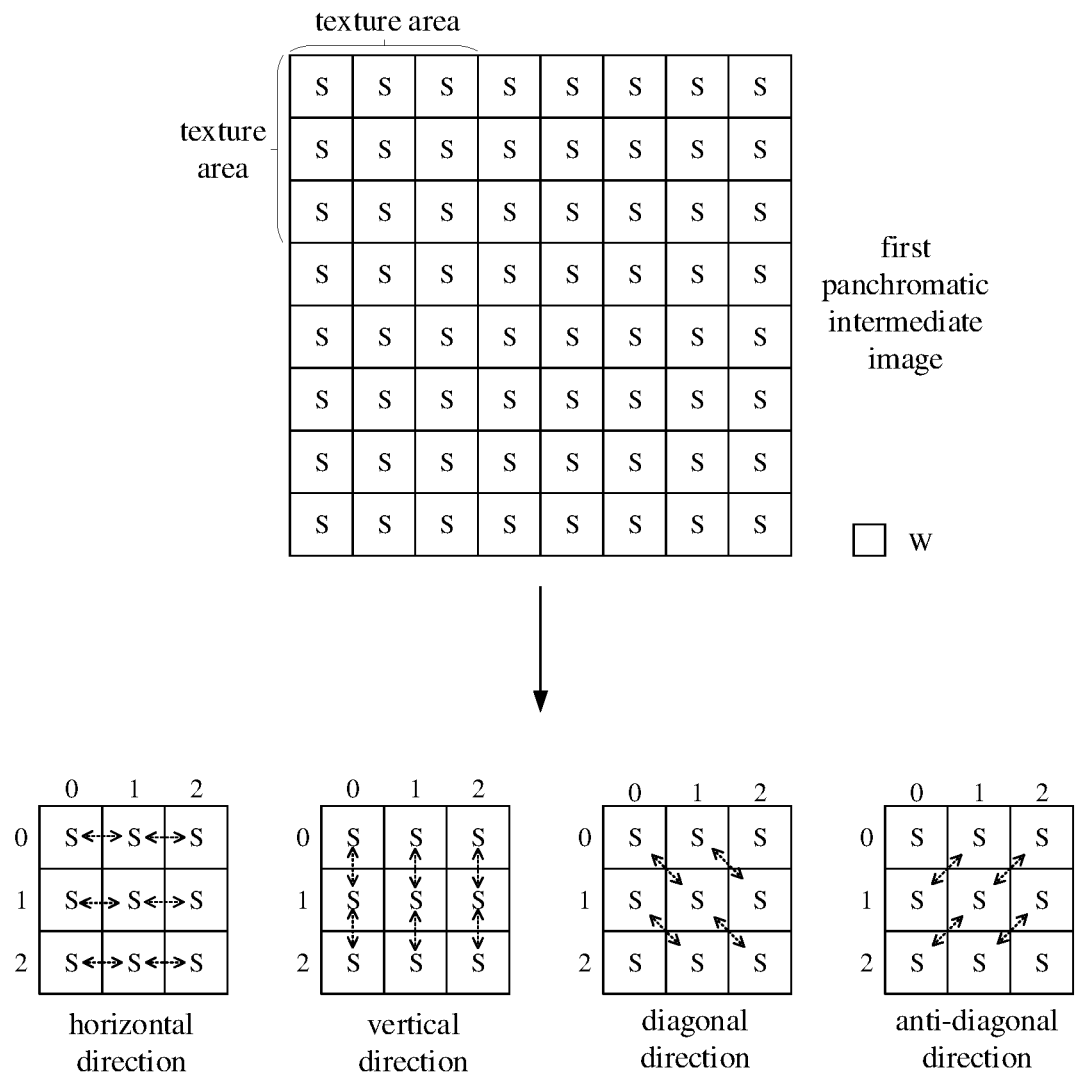

After acquiring the colored initial merged image and the first panchromatic intermediate image, the processor 20 performs the interpolation process on the colored initial merged image according to the first panchromatic intermediate image to obtain a colored intermediate merged image with the resolution equal to the resolution of the pixel array. Specifically, in conjunction with FIG. 1 and FIG. 15, the processor 20 first divides the first panchromatic intermediate image into a plurality of texture areas, and each texture area includes a plurality of image pixels (in an example of FIG. 15, each texture area includes 3*3 image pixels; in other examples, a number of image pixels in each texture area may also be other numbers, which is not limited here). Subsequently, the processor 20 calculates a target texture direction of each texture area, wherein the target texture direction may be any one of a horizontal direction, a vertical direction, a diagonal direction, an anti-diagonal direction, or a plane direction. Specifically, for each texture area, the processor 20 first calculates a feature value for the horizontal direction, a feature value for the vertical direction, a feature value for the diagonal direction, and a feature value for the anti-diagonal direction, and then determines the target texture direction of the texture area according to the plurality of feature values. Assuming that the 3*3 image pixels in the texture area are P00, P01, P02, P10, P11, P12, P20, P21, and P22 respectively, then: (1) for the feature value Diff_H in the horizontal direction, the processor 20 calculates an absolute value of a difference between P00 and P01, an absolute value of a difference between P01 and P02, an absolute value of a difference between P10 and P11, an absolute value of a difference between P11 and P12, an absolute value of a difference between P20 and P21, and an absolute value of a difference between P21 and P22, and calculates a mean value of these six absolute values, and the mean value is the feature value Diff_H in the horizontal direction. (2) For the feature value Diff_V in the vertical direction, the processor 20 calculates an absolute value of a difference between P00 and P10, an absolute value of a difference between P10 and P20, an absolute value of a difference between P01 and P11, an absolute value of a difference between P11 and P21, an absolute value of a difference between P02 and P12, and an absolute value of a difference between P12 and P22, and calculates a mean value of these six absolute values, and the mean value is the feature value Diff_V in the vertical direction. (3) For the feature value Diff_D in the diagonal direction, the processor 20 calculates an absolute value of a difference between P00 and P11, an absolute value of a difference between P01 and P12, an absolute value of a difference between P10 and P21, and an absolute value of a difference between P11 and P22, and calculates a mean value of these four absolute values, and the mean value is the feature value Diff_D in the diagonal direction. (4) For the feature value Diff_AD in the anti-diagonal direction, the processor 20 calculates an absolute value of a difference between P01 and P10, an absolute value of a difference between P02 and P11, an absolute value of a difference between P11 and P20, and an absolute value of a difference between P12 and P21, and calculates a mean value of the four absolute values, and the mean value is the feature value Diff_AD in the anti-diagonal direction. After obtaining the feature values of the four texture directions, the processor 20 may determine the target texture direction of the texture area according to the four feature values. Exemplarily, the processor 20 selects a largest feature value from the four feature values: (1) assuming that the largest feature value is Diff_H, and the preset threshold is Diff_PV, if Diff_H−Diff_V≥Diff_PV, Diff_H−Diff_D≥Diff_PV, and Diff_H−Diff_AD≥Diff_PV, the processor 20 determines that the target texture direction is the vertical direction; (2) assuming that the largest feature value is Diff_V, and the preset threshold is Diff_PV, if Diff_V−Diff_H≥Diff_PV, Diff_V−Diff_D≥Diff_PV, and Diff_V−Diff_AD≥Diff_PV, the processor 20 determines that the target texture direction is the horizontal direction; (3) assuming that the largest feature value is Diff_D, and the preset threshold is Diff_PV, if Diff_D−Diff_H≥Diff_PV, Diff_D−Diff_V≥Diff_PV, and Diff_D−

Diff_AD≥Diff_PV, then the processor 20 determines that the target texture direction is the anti-diagonal direction; (4) assuming that the largest feature value is Diff_AD, and the preset threshold is Diff_PV, if Diff_AD−Diff_H≥Diff_PV, Diff_AD−Diff_V≥Diff_PV, and Diff_AD−Diff_D≥Diff_PV, then the processor 20 determines the target texture direction is the diagonal direction. No matter which feature value of the texture direction to be selected is the largest feature value, as long as one difference among differences between the largest feature value and all remaining feature values is less than the preset threshold, the processor 20 determines that the target texture direction is plane direction. The target texture direction of the texture area is the plane direction, indicating that a shooting scene corresponding to the texture area may be a solid color scene.

After determining the target texture direction of each texture area, the processor 20 can determine an interpolation direction of image pixels of an area corresponding to a corresponding texture area in the colored initial merged image by using the target texture direction of each texture area, and perform the interpolation process on the colored initial merged image based on a determined interpolation direction to obtain a colored intermediate merged image with the resolution equal to the resolution of the pixel array 11. Specifically, if a target texture direction of a certain area in the colored initial merged image corresponding to the texture area in the first panchromatic intermediate image is the horizontal direction, the interpolation direction of the image pixels in this area is the horizontal direction. If the target texture direction of a certain area in the colored initial merged image corresponding to the texture area in the first panchromatic intermediate image is the vertical direction, the interpolation direction of the image pixels in this area is the vertical direction. If the target texture direction of a certain area in the colored initial merged image corresponding to the texture area in the first panchromatic intermediate image is the diagonal direction, the interpolation direction of the image pixels in this area is the diagonal direction. If the target texture direction of a certain area in the colored initial merged image corresponding to the texture area in the first panchromatic intermediate image is the anti-diagonal direction, the interpolation direction of the image pixels in this area is the anti-diagonal direction. If the target texture direction of a certain area in the colored initial merged image corresponding to the texture area in the first panchromatic intermediate image is the plane direction, the interpolation direction of the image pixels in this area is the plane direction. In this way, using the target texture direction to determine the interpolation direction of the image pixels can make the interpolation result more accurate, the color reproduction effect of a final image obtained by interpolation better, and consistency between a texture of an interpolated colored intermediate merged image and a texture of an actual shooting scene higher.

It should be noted that, when using the first panchromatic intermediate image to perform the interpolation process on the colored initial merged image, it is also possible not to divide a texture area of the colored original image. At this point, an entire colored initial merged image is considered as a texture area. Compared with a method of dividing the area, a method of not dividing the area reduces an amount of data to be processed by the processor 20, which helps increase a processing speed of the image and saves power consumption of the imaging apparatus 100. While the method of dividing the area increases the amount of data to be processed by the processor 20, color reproduction of the colored intermediate image calculated by this method is more accurate. During practical use, the processor 20 may adaptively select whether to divide the area according to different application scenarios. For example, when the power of the imaging apparatus 100 is low, the interpolation of the colored initial merged image may be realized by not dividing the area; when the power of the imaging apparatus 100 is high, the interpolation of the colored initial merged image may be realized by dividing the area. when shooting a static image, the interpolation of the colored initial merged image may be realized by dividing the area. when shooting a dynamic image (such as a video, a footage, etc.), the interpolation of the colored initial merged image may be realized by not dividing the area.

After obtaining the colored intermediate merged image, that is, the first panchromatic intermediate image, the processor 20 may fuse the colored intermediate merged image and the first panchromatic intermediate image to obtain the target image. The target image has a higher dynamic range and higher resolution, and image quality is better.

As shown in FIG. 1 to FIG. 3 and FIG. 16, in another example, some panchromatic photosensitive pixels W in a same subunit are exposed for the fourth exposure time, and remaining panchromatic photosensitive pixels W are exposed for the third exposure time exposure, wherein the fourth exposure time is shorter than or equal to the first exposure time and longer than the third exposure time. Specifically, for the photosensitive pixels 110 (four photosensitive pixels shown in FIG. 16) in each subunit, one of the monochromatic photosensitive pixels is exposed for the first exposure time (e.g., the long exposure duration L shown in FIG. 16), and another one of the monochromatic photosensitive pixels is exposed for the second exposure time (e.g., the short exposure duration S shown in FIG. 16), and another one of the panchromatic photosensitive pixels W is exposed for the third exposure time (e.g., the short exposure duration S shown in FIG. 16), and another one of the panchromatic photosensitive pixels W is exposed for the fourth exposure time (e.g., the long exposure duration L shown in FIG. 16).

It should be noted that, in some embodiments, the exposure process of the pixel array 11 may be: (1) the photosensitive pixels 110 exposed for the first exposure time, the photosensitive pixels 110 exposed for the second exposure time, the photosensitive pixels 110 exposed for the third exposure time, and the photosensitive pixels 110 exposed for the fourth exposure time are exposed in sequence (the exposure sequence of the four is not limited), and the exposure durations of the four do not overlap; (2) the photosensitive pixels 110 exposed for the first exposure time, the photosensitive pixels 110 exposed for the second exposure time, the photosensitive pixels 110 exposed for the third exposure time, and the photosensitive pixels 110 exposed for the fourth exposure time are exposed in sequence (the exposure sequence of the four is not limited), and the exposure durations of the four are partially overlapped; (3) the exposure duration of all photosensitive pixels 110 exposed for the shorter exposure duration is within the exposure duration of the photosensitive pixels 110 exposed for the longest exposure duration, for example, the exposure duration of all monochromatic photosensitive pixels exposed for the second exposure time is within the exposure duration of all monochromatic photosensitive pixels exposed for the first exposure time, and the exposure duration of all panchromatic photosensitive pixels W exposed for the third exposure time is within the exposure duration of all monochromatic photosensitive pixels exposed for the first exposure time, and the exposure duration of all panchromatic photosensitive pixels W exposed for the fourth exposure time is within the exposure duration of all monochromatic photosensitive pixels exposed for the first exposure time. In a specific embodiment of the present application, the imaging apparatus 100 adopts an exposure method (3), the use of the exposure method reduces an overall exposure duration required by the pixel array 11 and facilitates an increase in the frame rate of the image.

After the exposure of the pixel array 11 is completed, the image sensor 10 can output four original images, which are: (1) one first colored original image, which is composed of the first-color information generated by the plurality of monochromatic photosensitive pixels exposed for the long exposure duration L; (2) one second colored original image, which is composed of the second-color information generated by the plurality of monochromatic photosensitive pixels exposed for the short exposure duration S; (3) one first panchromatic original image, which is composed of the first panchromatic information generated by the plurality of panchromatic photosensitive pixels W exposed for the short exposure duration S; and (4) one second panchromatic original image, which is composed of second panchromatic information generated by the plurality of panchromatic photosensitive pixels W exposed for the long exposure duration L.

After obtaining the first colored original image, the second colored original image, the first panchromatic original image, and the second panchromatic original image, the image sensor 10 transmits these four original images to the processor 20, so that the processor 20 may performs subsequent processing on these four original images. The subsequent processing of the four original images by the processor 20 mainly includes: (1) performing the interpolation process on the first colored original image to obtain a first colored intermediate image with resolution lower than the resolution of the pixel array 11, and performing the interpolation process on the second colored original image to obtain a second colored intermediate image with resolution lower than the resolution of the pixel array 11; (2) performing the interpolation process on the first panchromatic original image to obtain a first panchromatic intermediate image with the resolution equal to the resolution of the pixel array 11; and performing the interpolation process on the second panchromatic original image to obtain a second panchromatic intermediate image with the resolution equal to the resolution of the pixel array 11; (3) performing the brightness alignment process on the first colored intermediate image and the second colored intermediate image to obtain the brightness-aligned first colored intermediate image; (4) performing the brightness alignment process on the first panchromatic intermediate image and the second panchromatic intermediate image to obtain a brightness-aligned second panchromatic intermediate image; (5) fusing the brightness-aligned first colored intermediate image and the second colored intermediate image to obtain the colored initial merged image; (6) fusing the first panchromatic intermediate image and the brightness-aligned second panchromatic intermediate image to a panchromatic merged image; (7) performing the interpolation process on the colored initial merged image according to the panchromatic merged image to obtain a colored intermediate merged image with the resolution equal to the resolution of the pixel array; (8) fusing the colored intermediate merged image and the panchromatic merged image to obtain the target image.

A process for the processor 20 to process the four original images is substantially same as a process for the processor 20 to process the three original images. Differences mainly include:

(a) in the process of processing the four original images, the processor 20 also needs to perform the interpolation process on the second panchromatic original image to obtain a second panchromatic intermediate image. The interpolation process of the second panchromatic original image is same as the interpolation process of the first panchromatic original image, which are calculation for image pixels that do not have pixel values, such that each image pixel in the interpolated second panchromatic intermediate image has a pixel value for a W color channel.

(b) The processor 20 also needs to perform the brightness alignment process on the first panchromatic intermediate image and the second panchromatic intermediate image to obtain a brightness-aligned second panchromatic intermediate image, which specifically includes: identifying the overexposed image pixels with pixel values greater than the second preset threshold in the second panchromatic intermediate image; for each overexposed image pixel, expanding the preset area with the overexposed image pixel as the center, and searching for intermediate image pixels with pixel values less than the second preset threshold in the preset area; correcting the pixel values of the overexposed image pixels by using the intermediate image pixels and the first panchromatic intermediate image; updating the second panchromatic intermediate image with the corrected pixel values of the overexposed image pixels to obtain the brightness-aligned second panchromatic intermediate image. The brightness alignment process of the first panchromatic intermediate image and the second panchromatic intermediate image is similar to the brightness alignment process of the first colored intermediate image and the second colored intermediate image, and will not be described herein again.

(c) The processor 20 needs to fuse the first panchromatic intermediate image and the brightness-aligned second panchromatic intermediate image to obtain the panchromatic merged image, which specifically includes: performing the motion detection on the brightness-aligned second panchromatic intermediate image; when there is no motion blurred area in the brightness-aligned second panchromatic intermediate image, fusing the first panchromatic intermediate image and the brightness-aligned second panchromatic intermediate image to obtain the panchromatic merged image; when there is the motion blurred area in the brightness-aligned second panchromatic intermediate image, fusing the first panchromatic intermediate image and areas of the brightness-aligned second panchromatic intermediate image other than the motion blurred area to obtain the panchromatic merged image. A fusion method of the first panchromatic intermediate image and the brightness-aligned second panchromatic intermediate image is similar to a fusion method of the second colored intermediate image and the brightness-aligned first colored intermediate image, and will not be described herein again.

(d) The processor 20 performs the interpolation process on the colored initial merged image according to the panchromatic merged image to obtain the colored intermediate merged image. The processor 20 also needs to calculate the target texture direction of at least one texture area, and then determine the interpolation direction of the colored initial merged image based on the target texture direction to perform the interpolation process on the colored initial merged image based on the determined interpolation direction, and obtain the colored intermediate merged image with more accurate color reproduction.

To sum up, the imaging apparatus 100 of an embodiment of the present application acquires a target image with a high dynamic range by controlling the plurality of photosensitive pixels 110 in each subunit in the pixel array 11 to expose for different exposure durations. In addition, in the process of acquiring the target image with the high dynamic range, using the panchromatic image composed of the panchromatic information generated by the panchromatic photosensitive pixels W to indicate an interpolation of the color image not only can improve resolution of a final obtained target image, but also improve color reproduction of the target image, thereby greatly improving imaging quality of the imaging apparatus 100.

Figure 16:
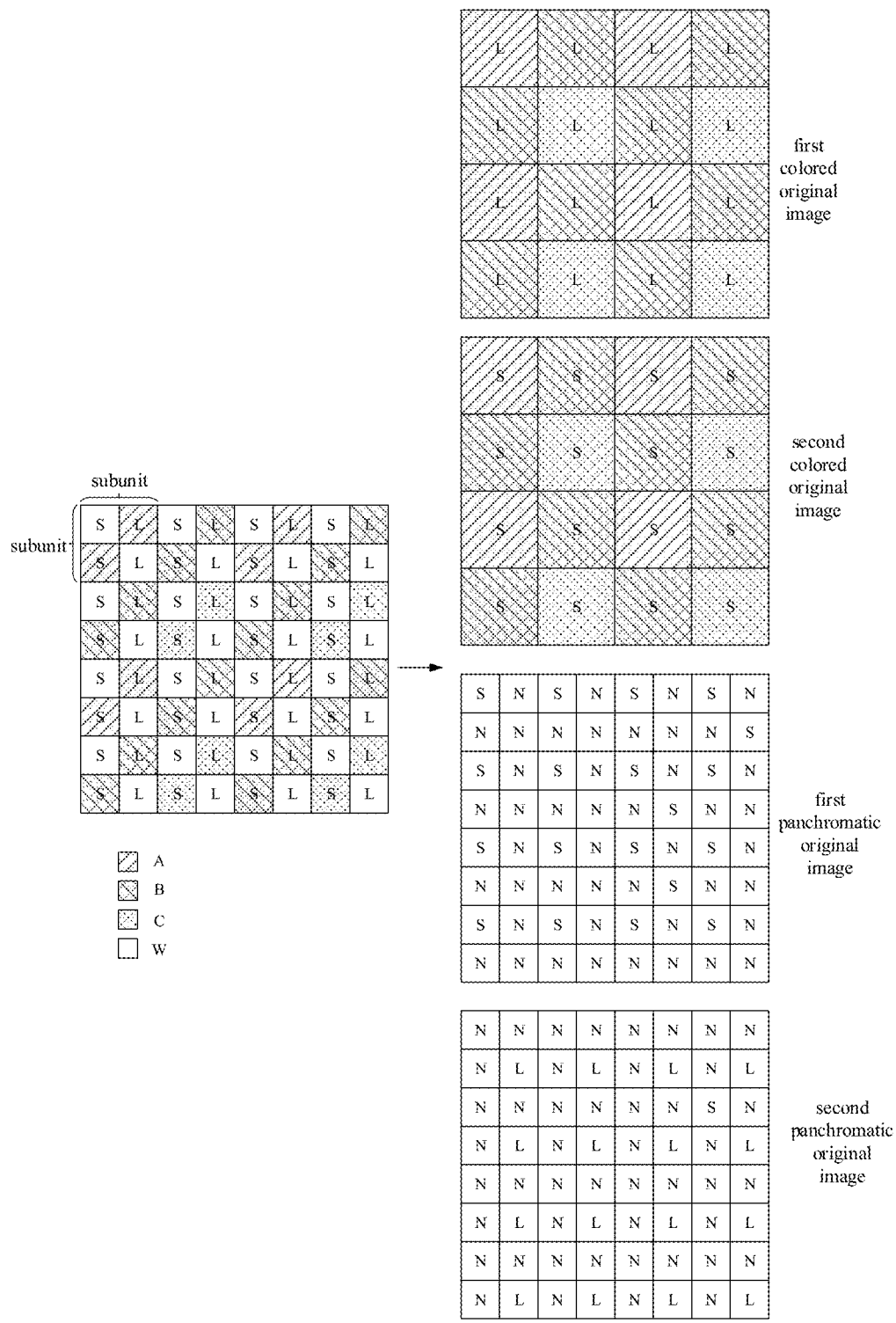

In the embodiments shown in FIG. 11 and FIG. 16, the third exposure time is equal to the second exposure time, and is equal to the short exposure duration. In other embodiments, the third exposure time may also be different from the second exposure time; for example, the third exposure time is longer than the second exposure time and shorter than the first exposure time, or the third exposure time is shorter than the second exposure time, etc. In the embodiment shown in FIG. 16, the fourth exposure time is equal to the first exposure time, and is equal to the long exposure duration. In other embodiments, the fourth exposure time may also be different from the first exposure time.

In some embodiments, the processor 20 may also first perform the interpolation process on the first colored intermediate image and the second colored intermediate image by using the first panchromatic intermediate image (or the panchromatic merged image) to obtain a first color high-resolution image and a second color high-resolution image with the resolution equal to the resolution of pixel array 11, respectively. The processor 20 then performs the brightness alignment and fusion processing on the first color high-resolution image and the second color high-resolution image, and fuses the processed images and the first panchromatic intermediate image (or the panchromatic merged image) to obtain a target image with the resolution equal to the resolution of the pixel array 11.

Figure 17:
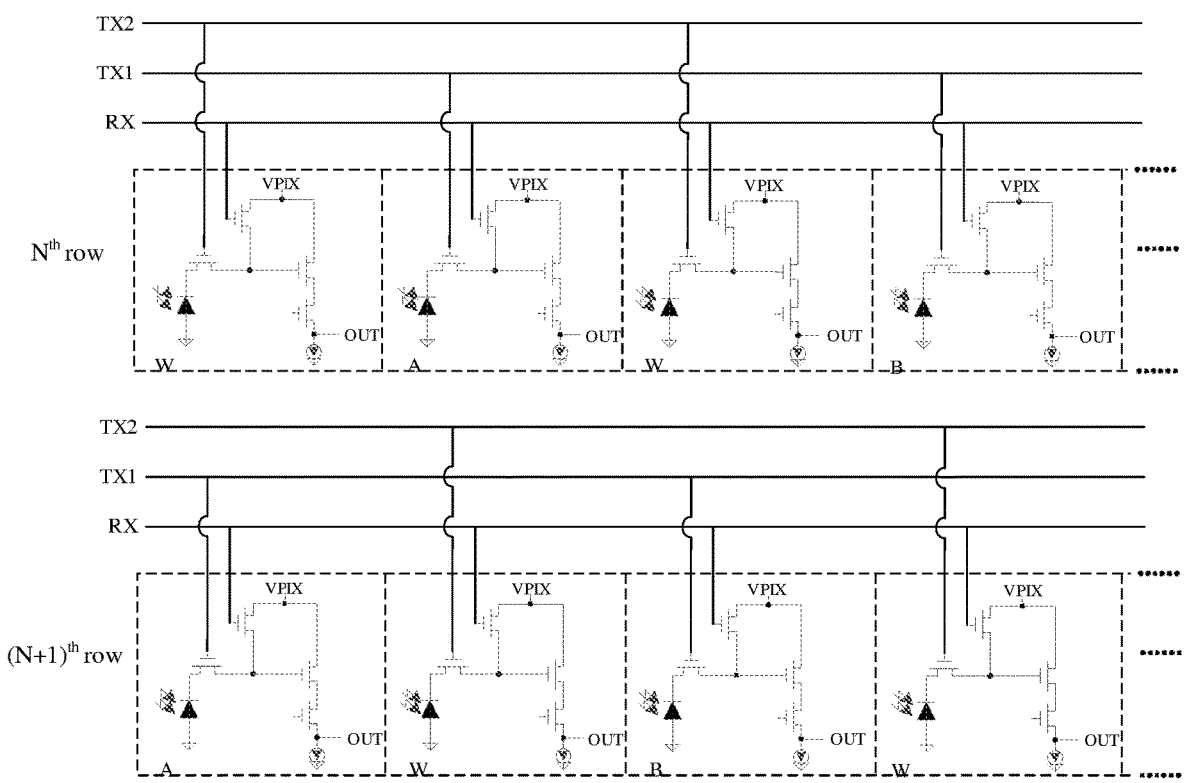
FIG. 17 to FIG. 19 are schematic diagrams of partial circuit connections of the pixel array according to some embodiments of the present application.

In some embodiments, in order to realize control of different exposure durations of different photosensitive pixels 110 in a same subunit, a circuit connection method of the photosensitive pixels 110 may be as follows: for any two adjacent rows of the photosensitive pixels 110, there is at least one row of the photosensitive pixels 110 satisfying a condition that the control terminals TG of the exposure control circuits of the plurality of monochromatic photosensitive pixels located in a same row are connected to a first exposure control line TX1, and the control terminals TG of the exposure control circuits of the plurality of panchromatic photosensitive pixels W are connected to a second exposure control line TX2, and the control terminals RG of the reset circuits of the plurality of monochromatic photosensitive pixels and the plurality of panchromatic photosensitive pixels W are connected to a reset line RX. At this time, the control unit 13 in the image sensor 10 can realize control of the different exposure durations of different photosensitive pixels 110 in the same subunit by controlling pulse timing of RX, TX1, and TX2. For example, as shown in FIG. 17, for the photosensitive pixels 110 in an $N^{th}$ row and an $(N+1)^{th}$ row, the control terminals TG of the exposure control circuits of the plurality of monochromatic photosensitive pixels in the same row are connected to the first exposure control line TX1, the control terminals TG of the exposure control circuits of the plurality of panchromatic photosensitive pixels W in the same row are connected to the second exposure control line TX2, and the control terminals RG of the reset circuits of the plurality of photosensitive pixels 110 in the same row are connected to the reset line RX. A connection method shown in FIG. 17 can be applied to both an exposure method of the pixel array 11 shown in FIG. 11 and an exposure method of the pixel array 11 shown in FIG. 16. Certainly, in other embodiments, it is also possible that the control terminals TG of the exposure control circuits of the plurality of monochromatic photosensitive pixels in one of the rows are connected to the first exposure control line TX1, and the control terminals TG of the exposure control circuits of the plurality of panchromatic photosensitive pixels W are connected the second exposure control line TX2, and the control terminals RG of the reset circuits of the plurality of photosensitive pixels 110 are connected to the reset line RX; and the control terminals TG of the exposure control circuits of the plurality of photosensitive pixels 110 in another row are connected to an exposure control line TX, and the control terminals RG of the reset circuits are connected with the reset line RX. This connection method is only applicable to the exposure method of the pixel array 11 shown in FIG. 11.

Figure 18:
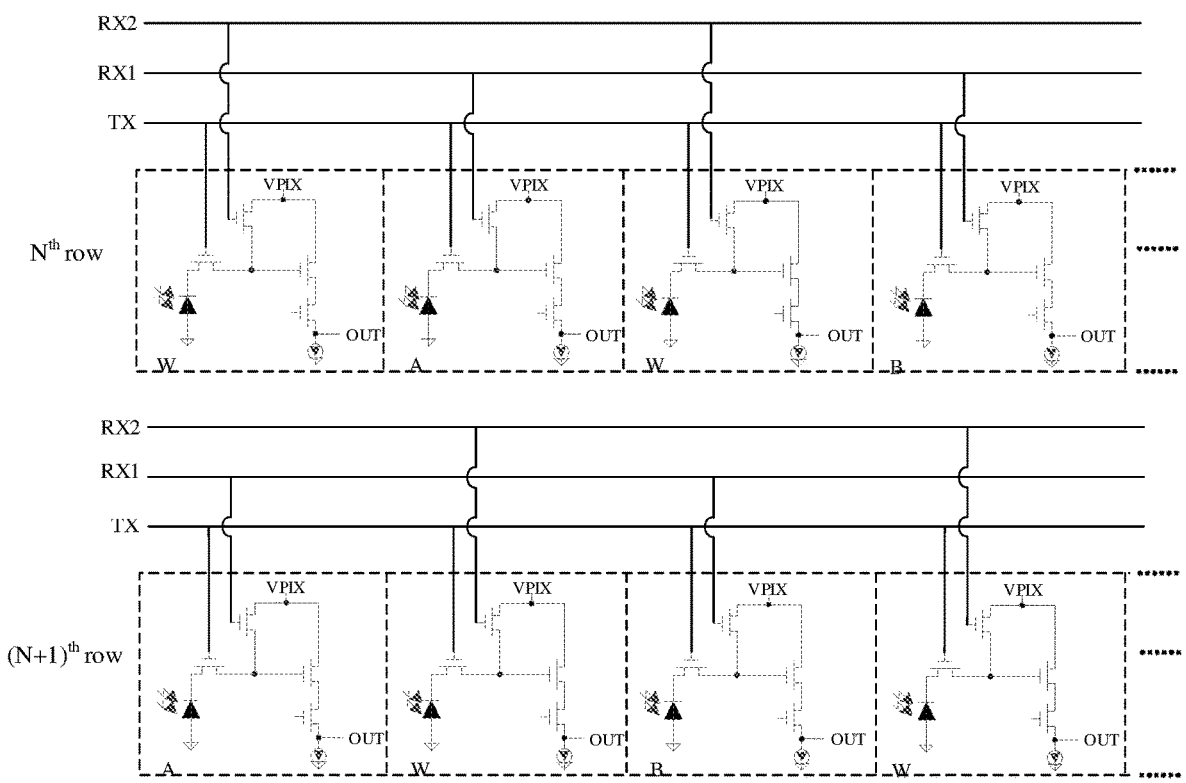

In some embodiments, in order to realize the control of different exposure durations of different photosensitive pixels 110 in the same subunit, the circuit connection method of the photosensitive pixels 110 may also be as follows: for any two adjacent rows of the photosensitive pixels 110, there is at least one row of the photosensitive pixels 110 satisfying a condition that the control terminals RG of the reset circuits of the plurality of monochromatic photosensitive pixels located in the same row are connected to the first reset line RX1, and the control terminals RG of the reset circuits of the plurality of panchromatic photosensitive pixels are connected to the second reset line RX2, and the control terminals TG of the exposure control circuits of the plurality of monochromatic photosensitive pixels and the plurality of panchromatic photosensitive pixels W are connected to the exposure control line TX. At this time, the control unit 13 in the image sensor 10 can realize control of the different exposure durations of different photosensitive pixels 110 in the same subunit by controlling the pulse timing of TX, RX1, and RX2. For example, as shown in FIG. 18, for the photosensitive pixels 110 in the $N^{th}$ row and the $(N+1)^{th}$ row, the control terminals RG of the reset circuits of the plurality of monochromatic photosensitive pixels in the same row are connected to the first reset line RX1, and the control terminals RG of the reset circuits of the plurality of panchromatic photosensitive pixels W in the same row are connected to the second reset line RX2, and the control terminals TG of the exposure control circuits of the plurality of photosensitive pixels 110 in the same row are connected to the exposure control line TX. A connection method shown in FIG. 18 can be applied to both the exposure method of the pixel array 11 shown in FIG. 11 and the exposure method of the pixel array 11 shown in FIG. 16. Certainly, in other embodiments, it is also possible that the control terminals RG of the reset circuits of the plurality of monochromatic photosensitive pixels in one of the rows are connected to the first reset line RX1, and the control terminals RG of the reset circuits of the plurality of panchromatic photosensitive pixels W are connected to the second reset line RX2, and the control terminals TG of the exposure control circuits of the plurality of photosensitive pixels 110 are connected to the exposure control line TX; and the control terminals TG of the exposure control circuits of the plurality of photosensitive pixels 110 in another row are connected to the exposure control line TX, and the control terminals RG of the reset circuit are connected to the reset line RX. This connection method is only applicable to the exposure method of the pixel array 11 shown in FIG. 11.

Figure 19:
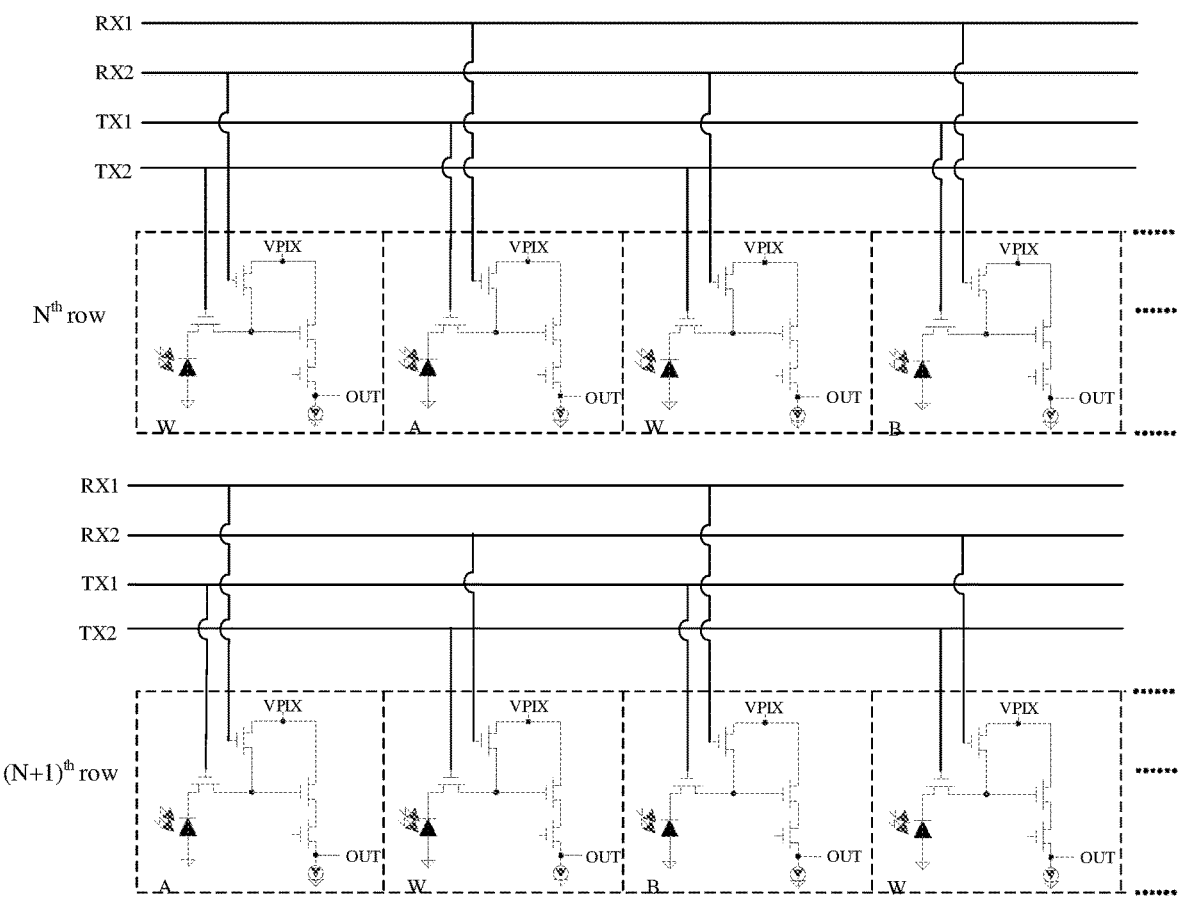

In some embodiments, in order to realize the control of different exposure durations of different photosensitive pixels 110 in the same subunit, the circuit connection method of the photosensitive pixels 110 may also be as follows: for any two adjacent rows of the photosensitive pixels 110, there is at least one row of the photosensitive pixels 110 satisfying a condition that the control terminals TG of the exposure control circuits of the plurality of monochromatic photosensitive pixels located in the same row are connected to the first exposure control line TX1, and the control terminals TG of the exposure control circuits of the plurality of panchromatic photosensitive pixels W are connected to the second exposure control line TX2, and the control terminals RG of the reset circuits of the plurality of monochromatic photosensitive pixels are connected to the first reset line RX1, and the control terminals RG of the reset circuits of the plurality of panchromatic photosensitive pixels W are connected to the second reset line RX2. At this time, the control unit 13 in the image sensor 10 can realize control of the different exposure durations of different photosensitive pixels 110 in the same subunit by controlling the pulse timing of TX1, TX2, RX1, and RX2. For example, as shown in FIG. 19, for the photosensitive pixels 110 in the $N^{th}$ row and the $(N+1)^{th}$ row, the control terminals RG of the reset circuits of the plurality of monochromatic photosensitive pixels in the same row are connected to the first reset line RX1, and the control terminals RG of the reset circuits of the plurality of panchromatic photosensitive pixels W in the same row are connected to the second reset line RX2, and the control terminals TG of the exposure control circuits of the plurality of monochromatic photosensitive pixels in the same row are connected to the first exposure control line TX1, and the control terminals TG of the exposure control circuits of the plurality of panchromatic photosensitive pixels W in the same row are connected to the second exposure control line TX2. A connection method shown in FIG. 19 can be applied to both the exposure method of the pixel array 11 shown in FIG. 11 and the exposure method of the pixel array 11 shown in FIG. 16. Certainly, in other embodiments, it is also possible that the control terminals RG of the reset circuits of the plurality of monochromatic photosensitive pixels in one of the rows are connected to the first reset line RX1, and the control terminals RG of the reset circuits of the plurality of panchromatic photosensitive pixels W are connected to the second reset line RX2, and the control terminals TG of the exposure control circuits of the plurality of monochromatic photosensitive pixels are connected to the first exposure control line TX1, and the control terminals TG of the exposure control circuits of the plurality of panchromatic photosensitive pixels W are connected to the second exposure control line TX2; the control terminals of the exposure control circuits of the plurality of photosensitive pixels 110 in another row are connected to an exposure control line TX, and the control terminals of the reset circuit are connected to a reset line RX. This connection method is only applicable to the exposure method of the pixel array 11 shown in FIG. 11.

Figure 20:
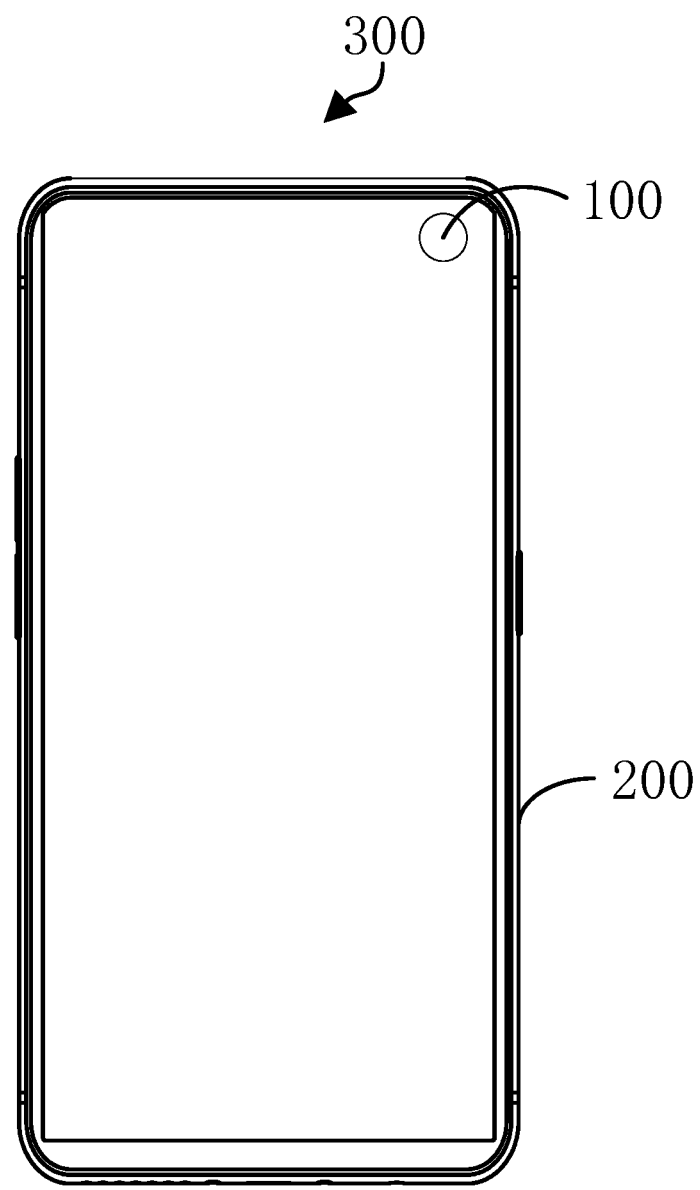
FIG. 20 is a schematic structural diagram of an electronic device according to an embodiment of the present application.
Figure 21:
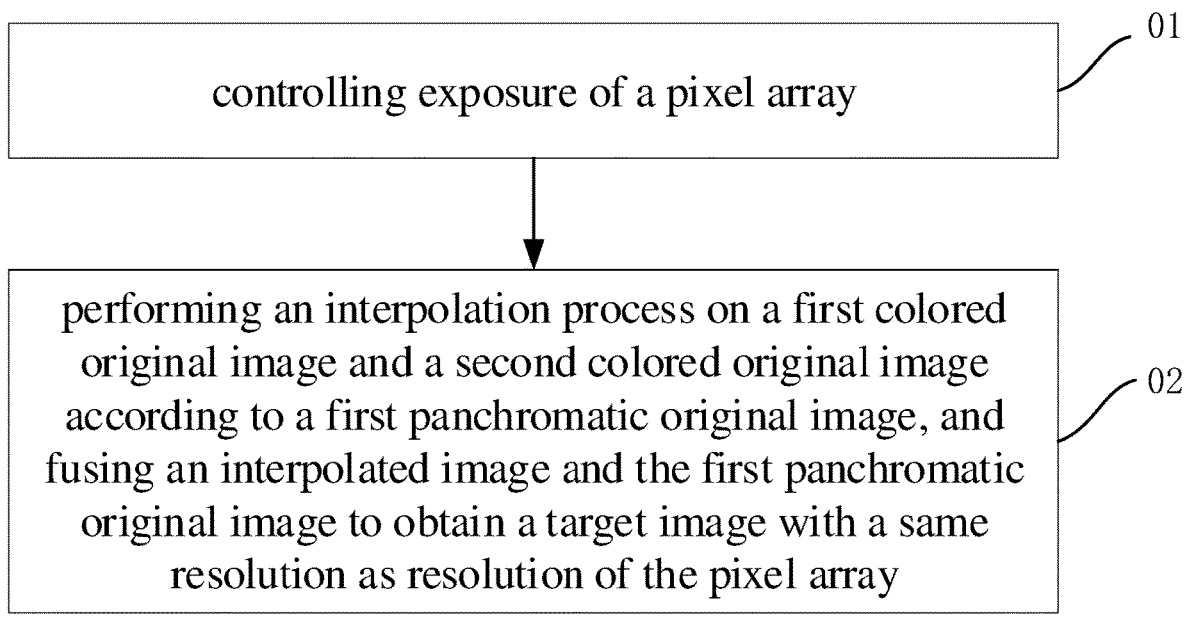
FIG. 21 is a schematic flowchart of an image acquisition method according to some embodiments of the present application.

Referring to FIG. 20, the present application further provides an electronic device 300. The electronic device 300 includes the imaging apparatus 100 described in any one of the above embodiments and the housing 200. The imaging apparatus 100 is combined with the housing 200.

The electronic device 300 may be a mobile phone, a tablet computer, a notebook computer, a smart wearable device (e.g., a smart watch, a smart bracelet, smart glasses, a smart helmet), a drone, and a head-mounted display device, etc., which are not limited herein.

The electronic device 300 of the embodiment of the present application acquires a target image with a high dynamic range by controlling the plurality of photosensitive pixels 110 in each subunit in the pixel array 11 to expose for different exposure durations. In addition, in the process of acquiring the target image with the high dynamic range, using the panchromatic image composed of the panchromatic information generated by the panchromatic photosensitive pixels W to indicate the interpolation of the color image not only can improve resolution of a final obtained target image, but also improve color reproduction of the target image, thereby greatly improving imaging quality of the electronic device 300.

Referring to FIG. 2, FIG. 3, FIG. 11 and FIG. 21, the present application further provides an image acquisition method that may be used in the image sensor 10 described in any one of the above embodiments. The image acquisition method includes:

Step 01: controlling exposure of the pixel array 11, wherein, for the plurality of photosensitive pixels 110 in the same subunit, at least one of the monochromatic photosensitive pixels is exposed for a first exposure time, and at least another one of the monochromatic photosensitive pixels is exposed for a second exposure time that is shorter than the first exposure time, and at least one panchromatic photosensitive pixel W is exposed for a third exposure time that is shorter than the first exposure time; and Step 02: performing an interpolation process on a first colored original image and a second colored original image according to a first panchromatic original image, and fusing an interpolated image and the first panchromatic original image to obtain a target image with a same resolution as resolution of the pixel array; wherein the first colored original image is obtained from first-color information generated by the monochromatic photosensitive pixels exposed for the first exposure time, and the second colored original image is obtained from second-color information generated by the monochromatic photosensitive pixels exposed for the second exposure time, and the first panchromatic original image is obtained from first panchromatic information generated by the panchromatic photosensitive pixels W exposed for the third exposure time.

In some embodiments, all panchromatic photosensitive pixels W are exposed for a third exposure time. Step 02 includes: performing the interpolation process on the first colored original image to obtain a first colored intermediate image with resolution lower than the resolution of the pixel array, performing the interpolation process on the second colored original image to obtain a second colored intermediate image with resolution lower than the resolution of the pixel array; performing the interpolation process on the first panchromatic original image to obtain a first panchromatic intermediate image with resolution equal to the resolution of the pixel array; performing a brightness alignment process on the first colored intermediate image and the second colored intermediate image to obtain a brightness-aligned first colored intermediate image; fusing the brightness-aligned first colored intermediate image and the second colored intermediate image to obtain a colored initial merged image; performing the interpolation process on the colored initial merged image according to the first panchromatic intermediate image to obtain a colored intermediate merged image with the resolution equal to the resolution of the pixel array; and fusing the colored intermediate merged image and the first panchromatic intermediate image to obtain a target image.

In some embodiments, please refer to FIG. 16, some panchromatic photosensitive pixels W in a same subunit are exposed for a fourth exposure time, and remaining panchromatic photosensitive pixels W are exposed for a third exposure time, and the fourth exposure time is shorter than or equal to the first exposure time and is longer than the third exposure time. Step 02 includes: performing the interpolation process on the first colored original image to obtain the first colored intermediate image with the resolution lower than the resolution of the pixel array, and performing the interpolation process on the second colored original image to obtain the second colored intermediate image with the resolution lower than the resolution of the pixel array; performing the interpolation process on the first panchromatic original image to obtain the first panchromatic intermediate image with the resolution equal to the resolution of the pixel array, and performing the interpolation process on a second panchromatic original image to obtain a second panchromatic intermediate image with the resolution equal to the resolution of the pixel array; wherein the second panchromatic original image is obtained from second panchromatic information generated by the panchromatic photosensitive pixels exposed for the fourth exposure time; performing the brightness alignment process on the first colored intermediate image and the second colored intermediate image to obtain the brightness-aligned first colored intermediate image; performing the brightness alignment process on the first panchromatic intermediate image and the second panchromatic intermediate image to obtain a brightness-aligned second panchromatic intermediate image; fusing the brightness-aligned first colored intermediate image and the second colored intermediate image to obtain the colored initial merged image; fusing the first panchromatic intermediate image and the brightness-aligned second panchromatic intermediate image to obtain a panchromatic merged image; performing the interpolation process on the colored initial merged image according to the panchromatic merged image to obtain the colored intermediate merged image with the resolution equal to the resolution of the pixel array; and fusing the colored intermediate merged image and the panchromatic merged image to obtain the target image.

In some embodiments, the step of performing the brightness alignment process on the first colored intermediate image and the second colored intermediate image to obtain the brightness-aligned first colored intermediate image includes: identifying overexposed image pixels with pixel values greater than a first preset threshold in the first colored intermediate image; for each overexposed image pixel, expanding a preset area with the overexposed image pixel as a center; searching for intermediate image pixels with pixel values less than the first preset threshold in the preset area; correcting the pixel values of the overexposed image pixels by using the intermediate image pixels and the second colored intermediate image; and updating the first colored intermediate image with corrected pixel values of the overexposed image pixels to obtain the brightness-aligned first colored intermediate image.

In some embodiments, the step of performing the brightness alignment process on the first panchromatic intermediate image and the second panchromatic intermediate image to obtain the brightness-aligned second panchromatic intermediate image includes: identifying overexposed image pixels with pixel values greater than a second preset threshold in the second panchromatic intermediate image; for each overexposed image pixel, expanding a preset area with the overexposed image pixel as a center; searching for intermediate image pixels with pixel values less than the second preset threshold in the preset area; correcting the pixel values of the overexposed image pixels by using the intermediate image pixels and the first panchromatic intermediate image; and updating the second panchromatic intermediate image with corrected pixel values of the overexposed image pixels to obtain the brightness-aligned second panchromatic intermediate image.

In some embodiments, the step of fusing the brightness-aligned first colored intermediate image and the second colored intermediate image to obtain the colored initial merged image includes: performing a motion detection on the brightness-aligned first colored intermediate image; when there is no motion blurred area in the brightness-aligned first colored intermediate image, fusing the brightness-aligned first colored intermediate image and the second colored intermediate image to obtain the colored initial merged image; when there is a motion blurred area in the brightness-aligned first colored intermediate image, fusing areas of the brightness-aligned first colored intermediate image other than the motion blurred area and the second colored intermediate image to obtain the colored initial merged image.

In some embodiments, the step of fusing the first panchromatic intermediate image and the brightness-aligned second panchromatic intermediate image to obtain the panchromatic merged image includes: performing the motion detection on the brightness-aligned second panchromatic intermediate image; when there is no motion blurred area in the brightness-aligned second panchromatic intermediate image, fusing the first panchromatic intermediate image and the brightness-aligned second panchromatic intermediate image to obtain the panchromatic merged image; when there is a motion blurred area in the brightness-aligned second panchromatic intermediate image, fusing the first panchromatic intermediate image and areas of the brightness-aligned second panchromatic intermediate image other than the motion blurred area to obtain the panchromatic merged image.

A specific implementation process of the image acquisition method described in any one of the above-mentioned embodiments is the same as a specific implementation process of the imaging apparatus 100 (shown in FIG. 1) to acquire a target image with high resolution and a high dynamic range, which will not be described here.

Figure 22:
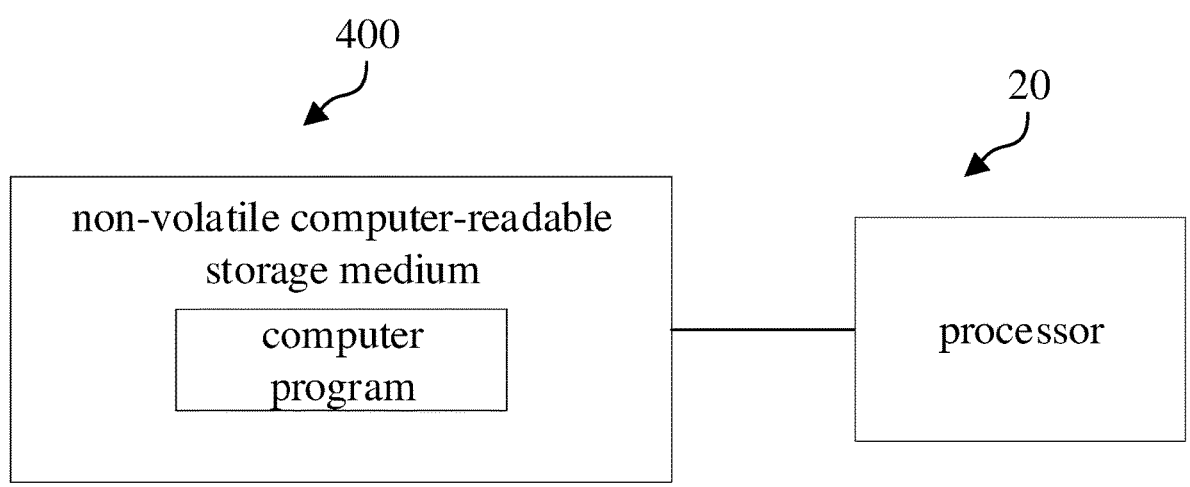
FIG. 22 is a schematic diagram of interaction between a non-transitory computer-readable storage medium and a processor according to some embodiments of the present application.

Referring to FIG. 22, the present application also provides a non-transitory computer-readable storage medium 400 containing a computer program. When the computer program is executed by the processor 20, the processor 20 is caused to execute the image acquisition method described in any one of the above-mentioned embodiments.

For example, please refer to FIG. 1, FIG. 3, FIG. 11, and FIG. 22. When the computer program is executed by the processor 20, the processor 20 is caused to perform the following steps:

controlling exposure of the pixel array 11, wherein, for the plurality of photosensitive pixels 110 in the same subunit, at least one of the monochromatic photosensitive pixels is exposed for a first exposure time, and at least another one of the monochromatic photosensitive pixels is exposed for a second exposure time that is shorter than the first exposure time, and at least one panchromatic photosensitive pixel W is exposed for a third exposure time that is shorter than the first exposure time; and performing an interpolation process on a first colored original image and a second colored original image according to a first panchromatic original image, and fusing an interpolated image and the first panchromatic original image to obtain a target image with a same resolution as resolution of the pixel array; wherein the first colored original image is obtained from first-color information generated by the monochromatic photosensitive pixels exposed for the first exposure time, and the second colored original image is obtained from second-color information generated by the monochromatic photosensitive pixels exposed for the second exposure time, and the first panchromatic original image is obtained from first panchromatic information generated by the panchromatic photosensitive pixels W exposed for the third exposure time.

For another example, referring to FIG. 22, when the computer program is executed by the processor 20, the processor 20 is caused to perform following steps:

performing the interpolation process on the first colored original image to obtain a first colored intermediate image with resolution lower than the resolution of the pixel array, performing the interpolation process on the second colored original image to obtain a second colored intermediate image with resolution lower than the resolution of the pixel array;

performing the interpolation process on the first panchromatic original image to obtain a first panchromatic intermediate image with resolution equal to the resolution of the pixel array;

performing a brightness alignment process on the first colored intermediate image and the second colored intermediate image to obtain a brightness-aligned first colored intermediate image;

fusing the brightness-aligned first colored intermediate image and the second colored intermediate image to obtain a colored initial merged image;

performing the interpolation process on the colored initial merged image according to the first panchromatic intermediate image to obtain a colored intermediate merged image with the resolution equal to the resolution of the pixel array; and fusing the colored intermediate merged image and the first panchromatic intermediate image to obtain a target image.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present application. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

Any process or method described in the flowchart or otherwise described herein may be understood to include one or more modules, fragments, or portions of code of an executable instruction to implement a particular logical function or process. In addition, the scope of at least one embodiment of the present application includes additional implementations in which the functions may be performed in a sequence that is not shown or discussed, including in a substantially simultaneous manner or in the reverse order depending on the function involved, which is understood by those skilled in the art to which this present application pertains.

While the embodiments of the present disclosure have been shown and described above, it is to be understood that the above embodiments are exemplary and are not to be construed as limiting the present disclosure. One of ordinary skill in the art may make variations, modifications, substitutions, and alterations to the above embodiments within the scope of the present application.

What is claimed is:

1. An image acquisition method applied to an image sensor, wherein the image sensor comprises a pixel array, the pixel array comprises a plurality of panchromatic photosensitive pixels and a plurality of color photosensitive pixels, and the color photosensitive pixels have a narrower spectral response than the panchromatic photosensitive pixels; the pixel array comprises minimal repeating units, each of the minimal repeating units comprises a plurality of subunits, and each of the subunits comprises a plurality of monochromatic photosensitive pixels and a plurality of panchromatic photosensitive pixels; the image acquisition method comprises:

controlling exposure of the pixel array, wherein for a plurality of photosensitive pixels in a same subunit, at least one of the monochromatic photosensitive pixels is exposed for a first exposure time, and at least another one of the monochromatic photosensitive pixels is exposed for a second exposure time shorter than the first exposure time, and at least one of the panchromatic photosensitive pixels is exposed for a third exposure time shorter than the first exposure time; and performing an interpolation process on a first colored original image and a second colored original image according to a first panchromatic original image, and fusing an interpolated image and the first panchromatic original image to obtain a target image with a same resolution as resolution of the pixel array; wherein the first colored original image is obtained from first-color information generated by the monochromatic photosensitive pixels exposed for the first exposure time, and the second colored original image is obtained from second-color information generated by the monochromatic photosensitive pixels exposed for the second exposure time; and the first panchromatic original image is obtained from first panchromatic information generated by the panchromatic photosensitive pixels exposed for the third exposure time.

2. The image acquisition method as claimed in claim 1, wherein all panchromatic photosensitive pixels are exposed for the third exposure time, the step of performing the interpolation process on the first colored original image and the second colored original image according to the first panchromatic original image and fusing the interpolated image and the first panchromatic original image to obtain the target image with the same resolution as the resolution of the pixel array comprises:

performing the interpolation process on the first colored original image to obtain a first colored intermediate image with resolution lower than the resolution of the pixel array, and performing the interpolation process on the second colored original image to obtain a second colored intermediate image with resolution lower than the resolution of the pixel array;

performing the interpolation process on the first panchromatic original image to obtain a first panchromatic intermediate image with resolution equal to the resolution of the pixel array;

performing a brightness alignment process on the first colored intermediate image and the second colored intermediate image to obtain a brightness-aligned first colored intermediate image;

fusing the brightness-aligned first colored intermediate image and the second colored intermediate image to obtain a colored initial merged image;

performing the interpolation process on the colored initial merged image according to the first panchromatic intermediate image to obtain a colored intermediate merged image with the resolution equal to the resolution of the pixel array; and fusing the colored intermediate merged image and the first panchromatic intermediate image to obtain the target image.

3. The image acquisition method as claimed in claim 1, wherein some panchromatic photosensitive pixels in a same subunit are exposed for a fourth exposure time, and remaining panchromatic photosensitive pixels are exposed for the third exposure time, and the fourth exposure time is shorter than or equal to the first exposure time and longer than the third exposure time; the step of performing the interpolation process on the first colored original image and the second colored original image according to the first panchromatic original image and fusing the interpolated image and the first panchromatic original image to obtain the target image with the same resolution as the resolution of the pixel array comprises:

performing the interpolation process on the first colored original image to obtain a first colored intermediate image with resolution lower than the resolution of the pixel array, and performing the interpolation process on the second colored original image to obtain a second colored intermediate image with resolution lower than the resolution of the pixel array;

performing the interpolation process on the first panchromatic original image to obtain a first panchromatic intermediate image with resolution equal to the resolution of the pixel array, and performing the interpolation process on a second panchromatic original image to obtain a second panchromatic intermediate image with the resolution equal to the resolution of the pixel array, wherein the second panchromatic original image is obtained from second panchromatic information generated by the panchromatic photosensitive pixels exposed for the fourth exposure time;

performing a brightness alignment process on the first colored intermediate image and the second colored intermediate image to obtain a brightness-aligned first colored intermediate image;

performing the brightness alignment process on the first panchromatic intermediate image and the second panchromatic intermediate image to obtain a brightness-aligned second panchromatic intermediate image;

fusing the brightness-aligned first colored intermediate image and the second colored intermediate image to obtain a colored initial merged image;

fusing the first panchromatic intermediate image and the brightness-aligned second panchromatic intermediate image to obtain a panchromatic merged image;

performing the interpolation process on the colored initial merged image according to the panchromatic merged image to obtain a colored intermediate merged image with the resolution equal to the resolution of the pixel array; and fusing the colored intermediate merged image and the panchromatic merged image to obtain the target image.

4. The image acquisition method as claimed in claim 2, wherein when all panchromatic photosensitive pixels are exposed for the third exposure time, an exposure duration of all monochromatic photosensitive pixels exposed for the second exposure time is within an exposure duration of all monochromatic photosensitive pixels exposed for the first exposure time, and an exposure duration of all panchromatic photosensitive pixels exposed for the third exposure time is within the exposure duration of all monochromatic photosensitive pixels exposed for the first exposure time;

when some panchromatic photosensitive pixels in the same subunit are exposed for a fourth exposure time, and remaining panchromatic photosensitive pixels are exposed for the third exposure time, the exposure duration of all monochromatic photosensitive pixels exposed for the second exposure time is within the exposure duration of all monochromatic photosensitive pixels exposed for the first exposure time, and the exposure duration of all panchromatic photosensitive pixels exposed for the third exposure time is within the exposure duration of all monochromatic photosensitive pixels exposed for the first exposure time, and an exposure duration of all monochromatic photosensitive pixels exposed for the fourth exposure time is within the exposure duration of all monochromatic photosensitive pixels exposed for the first exposure time.

5. The image acquisition method as claimed in claim 2, wherein the step of performing the brightness alignment process on the first colored intermediate image and the second colored intermediate image to obtain the brightness-aligned first colored intermediate image comprises:

identifying overexposed image pixels with pixel values greater than a first preset threshold in the first colored intermediate image;

for each overexposed image pixel, expanding a preset area with the overexposed image pixel as a center;

searching for intermediate image pixels with pixel values less than the first preset threshold in the preset area;

correcting the pixel values of the overexposed image pixels by using the intermediate image pixels and the second colored intermediate image; and updating the first colored intermediate image with corrected pixel values of the overexposed image pixels to obtain the brightness-aligned first colored intermediate image.

6. The image acquisition method as claimed in claim 3, wherein the step of performing the brightness alignment process on the first panchromatic intermediate image and the second panchromatic intermediate image to obtain the brightness-aligned second panchromatic intermediate image comprises:

identifying overexposed image pixels with pixel values greater than a second preset threshold in the second panchromatic intermediate image;

for each overexposed image pixel, expanding a preset area with the overexposed image pixel as a center;

searching for intermediate image pixels with pixel values less than the second preset threshold in the preset area;

correcting the pixel values of the overexposed image pixels by using the intermediate image pixels and the first panchromatic intermediate image; and updating the second panchromatic intermediate image with corrected pixel values of the overexposed image pixels to obtain the brightness-aligned second panchromatic intermediate image.

7. The image acquisition method as claimed in claim 2, wherein the step of fusing the brightness-aligned first colored intermediate image and the second colored intermediate image to obtain the colored initial merged image comprises:
performing a motion detection on the brightness-aligned first colored intermediate image;
when there is no motion blurred area in the brightness-aligned first colored intermediate image, fusing the brightness-aligned first colored intermediate image and the second colored intermediate image to obtain the colored initial merged image;
when there is a motion blurred area in the brightness-aligned first colored intermediate image, fusing areas of the brightness-aligned first colored intermediate image other than the motion blurred area and the second colored intermediate image to obtain the colored initial merged image.

8. The image acquisition method as claimed in claim 3, wherein the step of fusing the first panchromatic intermediate image and the brightness-aligned second panchromatic intermediate image to obtain the panchromatic merged image comprises:
performing a motion detection on the brightness-aligned second panchromatic intermediate image;
when there is no motion blurred area in the brightness-aligned second panchromatic intermediate image, fusing the first panchromatic intermediate image and the brightness-aligned second panchromatic intermediate image to obtain the panchromatic merged image;
when there is a motion blurred area in the brightness-aligned second panchromatic intermediate image, fusing the first panchromatic intermediate image and areas of the brightness-aligned second panchromatic intermediate image other than the motion blurred area to obtain the panchromatic merged image.

9. An electronic device, comprising:
an image sensor, the image sensor comprising a pixel array, wherein the pixel array comprises a plurality of panchromatic photosensitive pixels and a plurality of color photosensitive pixels, and the color photosensitive pixels have a narrower spectral response than the panchromatic photosensitive pixels; the pixel array comprises minimal repeating units, each of the minimal repeating units comprises a plurality of subunits, and each of the subunits comprises a plurality of monochromatic photosensitive pixels and a plurality of panchromatic photosensitive pixels; the pixel array in the image sensor is exposed, wherein for a plurality of photosensitive pixels in a same subunit, at least one of the monochromatic photosensitive pixels is exposed for a first exposure time, and at least another one of the monochromatic photosensitive pixels is exposed for a second exposure time shorter than the first exposure time, and at least one of the panchromatic photosensitive pixels is exposed for a third exposure time shorter than the first exposure time; and
one or more processors and a memory configured to store instructions which, when executed by the one or more processors, cause the one or more processors to perform an interpolation process on a first colored original image and a second colored original image according to a first panchromatic original image, and fuse an interpolated image and the first panchromatic original image to obtain a target image with a same resolution as resolution of the pixel array; wherein the first colored original image is obtained from first-color information generated by the monochromatic photosensitive pixels exposed for the first exposure time, and the second colored original image is obtained from second-color information generated by the monochromatic photosensitive pixels exposed for the second exposure time, and the first panchromatic original image is obtained from first panchromatic information generated by the panchromatic photosensitive pixels exposed for the third exposure time.

10. The electronic device as claimed in claim 9, wherein all panchromatic photosensitive pixels are exposed for the third exposure time, and the one or more processors are further configured to:
perform the interpolation process on the first colored original image to obtain a first colored intermediate image with resolution lower than the resolution of the pixel array, and perform the interpolation process on the second colored original image to obtain a second colored intermediate image with resolution lower than the resolution of the pixel array;
perform the interpolation process on the first panchromatic original image to obtain a first panchromatic intermediate image with resolution equal to the resolution of the pixel array;
perform a brightness alignment process on the first colored intermediate image and the second colored intermediate image to obtain a brightness-aligned first colored intermediate image;
fuse the brightness-aligned first colored intermediate image and the second colored intermediate image to obtain a colored initial merged image;
perform the interpolation process on the colored initial merged image according to the first panchromatic intermediate image to obtain a colored intermediate merged image with the resolution equal to the resolution of the pixel array; and
fuse the colored intermediate merged image and the first panchromatic intermediate image to obtain the target image.

11. The electronic device as claimed in claim 9, wherein some panchromatic photosensitive pixels in a same subunit are exposed for a fourth exposure time, and remaining panchromatic photosensitive pixels are exposed for the third exposure time, and the fourth exposure time is shorter than or equal to the first exposure time and longer than the third exposure time; the one or more processors are further configured to:
perform the interpolation process on the first colored original image to obtain a first colored intermediate image with resolution lower than the resolution of the pixel array, and perform the interpolation process on the second colored original image to obtain a second colored intermediate image with resolution lower than the resolution of the pixel array;
perform the interpolation process on the first panchromatic original image to obtain a first panchromatic intermediate image with resolution equal to the resolution of the pixel array, and perform the interpolation process on a second panchromatic original image to obtain a second panchromatic intermediate image with the resolution equal to the resolution of the pixel array, wherein the second panchromatic original image is obtained from second panchromatic information generated by the panchromatic photosensitive pixels exposed for the fourth exposure time;

perform a brightness alignment process on the first colored intermediate image and the second colored intermediate image to obtain a brightness-aligned first colored intermediate image;

perform the brightness alignment process on the first panchromatic intermediate image and the second panchromatic intermediate image to obtain a brightness-aligned second panchromatic intermediate image;

fuse the brightness-aligned first colored intermediate image and the second colored intermediate image to obtain a colored initial merged image;

fuse the first panchromatic intermediate image and the brightness-aligned second panchromatic intermediate image to obtain a panchromatic merged image;

perform the interpolation process on the colored initial merged image according to the panchromatic merged image to obtain a colored intermediate merged image with the resolution equal to the resolution of the pixel array; and fuse the colored intermediate merged image and the panchromatic merged image to obtain the target image.

12. The electronic device as claimed in claim 10, wherein when all panchromatic photosensitive pixels are exposed for the third exposure time, an exposure duration of all monochromatic photosensitive pixels exposed for the second exposure time is within an exposure duration of all monochromatic photosensitive pixels exposed for the first exposure time, and an exposure duration of all panchromatic photosensitive pixels exposed for the third exposure time is within the exposure duration of all monochromatic photosensitive pixels exposed for the first exposure time;

when some panchromatic photosensitive pixels in the same subunit are exposed for a fourth exposure time, and remaining panchromatic photosensitive pixels are exposed for the third exposure time, the exposure duration of all monochromatic photosensitive pixels exposed for the second exposure time is within the exposure duration of all monochromatic photosensitive pixels exposed for the first exposure time, the exposure duration of all panchromatic photosensitive pixels exposed for the third exposure time is within the exposure duration of all monochromatic photosensitive pixels exposed for the first exposure time, and an exposure duration of all monochromatic photosensitive pixels exposed for the fourth exposure time is within the exposure duration of all monochromatic photosensitive pixels exposed for the first exposure time.

13. The electronic device as claimed in claim 10, wherein the one or more processors are further configured to:

identify overexposed image pixels with pixel values greater than a first preset threshold in the first colored intermediate image;

for each overexposed image pixel, expand a preset area with the overexposed image pixel as a center;

search for intermediate image pixels with pixel values less than the first preset threshold in the preset area;

correct the pixel values of the overexposed image pixels by using the intermediate image pixels and the second colored intermediate image; and update the first colored intermediate image with corrected pixel values of the overexposed image pixels to obtain the brightness-aligned first colored intermediate image.

14. The electronic device as claimed in claim 11, wherein the one or more processors are further configured to:

identify overexposed image pixels with pixel values greater than a second preset threshold in the second panchromatic intermediate image;

for each overexposed image pixel, expand a preset area with the overexposed image pixel as a center;

search for intermediate image pixels with pixel values less than the second preset threshold in the preset area;

correct the pixel values of the overexposed image pixels by using the intermediate image pixels and the first panchromatic intermediate image; and update the second panchromatic intermediate image with the corrected pixel values of the overexposed image pixels to obtain the brightness-aligned second panchromatic intermediate image.

15. The electronic device as claimed in claim 10, wherein the one or more processors are further configured to:

perform a motion detection on the brightness-aligned first colored intermediate image;

when there is no motion blurred area in the brightness-aligned first colored intermediate image, fuse the brightness-aligned first colored intermediate image and the second colored intermediate image to obtain the colored initial merged image;

when there is a motion blurred area in the brightness-aligned first colored intermediate image, fuse areas of the brightness-aligned first colored intermediate image other than the motion blurred area and the second colored intermediate image to obtain the colored initial merged image.

16. The electronic device as claimed in claim 11, wherein the one or more processors are further configured to:

perform a motion detection on the brightness-aligned second panchromatic intermediate image;

when there is no motion blurred area in the brightness-aligned second panchromatic intermediate image, fuse the first panchromatic intermediate image and the brightness-aligned second panchromatic intermediate image to obtain the panchromatic merged image;

when there is a motion blurred area in the brightness-aligned second panchromatic intermediate image, fuse the first panchromatic intermediate image and areas of the brightness-aligned second panchromatic intermediate image other than the motion blurred area to obtain the panchromatic merged image.

17. The electronic device as claimed in claim 9, wherein the pixel array is arranged in a two-dimensional matrix;

for any two adjacent rows of photosensitive pixels, there is at least one row of the photosensitive pixels satisfying a condition that control terminals of exposure control circuits of the plurality of monochromatic photosensitive pixels located in a same row are connected to a first exposure control line, and control terminals of exposure control circuits of the plurality of panchromatic photosensitive pixels are connected to a second exposure control line, and control terminals of reset circuits of the plurality of monochromatic photosensitive pixels and the plurality of panchromatic photosensitive pixels are connected to a reset line; or for any two adjacent rows of the photosensitive pixels, there is at least one row of the photosensitive pixels satisfying a condition that control terminals of reset circuits of the plurality of monochromatic photosensitive pixels located in a same row are connected to a first reset line, and control terminals of reset circuits of the plurality of panchromatic photosensitive pixels are connected to a second reset line, and control terminals of the exposure control circuits of the plurality of monochromatic photosensitive pixels and the plurality of panchromatic photosensitive pixels are connected to an exposure control line; or for any two adjacent rows of the photosensitive pixels, there is at least one row of the photosensitive pixels satisfying a condition that the control terminals of the exposure control circuits of the plurality of monochromatic photosensitive pixels located in a same row are connected to the first exposure control line, and the control terminals of the exposure control circuits of the plurality of panchromatic photosensitive pixels are connected to the second exposure control line, and the control terminals of the reset circuits of the plurality of monochromatic photosensitive pixels are connected to the first reset line, and the control terminals of the reset circuits of the plurality of panchromatic photosensitive pixels are connected to the second reset line.

18. The electronic device as claimed in claim 9, wherein an arrangement of the minimal repeating units is:

| W | A | W | B |
|---|---|---|---|
| A | W | B | W |
| W | B | W | C |
| B | W | C | W |

W represents the panchromatic photosensitive pixel; A represents a first-color photosensitive pixel in the plurality of color photosensitive pixels; B represents a second-color photosensitive pixel in the plurality of color photosensitive pixels; C represents a third-color photosensitive pixel in the plurality of color photosensitive pixels.

19. A non-transitory computer-readable storage medium having stored instructions that is executed by a processor of an electronic device, cause the processor of the electronic device to perform an interpolation process on a first colored original image and a second colored original image according to a first panchromatic original image, and fuse an interpolated image and the first panchromatic original image to obtain a target image with a same resolution as resolution of a pixel array; wherein the first colored original image is obtained from first-color information generated by monochromatic photosensitive pixels exposed for a first exposure time, and the second colored original image is obtained from second-color information generated by monochromatic photosensitive pixels exposed for a second exposure time, and the first panchromatic original image is obtained from first panchromatic information generated by panchromatic photosensitive pixels exposed for a third exposure time.

20. The non-transitory computer-readable storage medium of claim 19, wherein the instructions of performing the interpolation process on the first colored original image and the second colored original image according to the first panchromatic original image and fusing the interpolated image and the first panchromatic original image to obtain the target image with the same resolution as the resolution of the pixel array comprises:

performing the interpolation process on the first colored original image to obtain a first colored intermediate image with resolution lower than the resolution of the pixel array, and performing the interpolation process on the second colored original image to obtain a second colored intermediate image with resolution lower than the resolution of the pixel array;

performing the interpolation process on the first panchromatic original image to obtain a first panchromatic intermediate image with resolution equal to the resolution of the pixel array;

performing a brightness alignment process on the first colored intermediate image and the second colored intermediate image to obtain a brightness-aligned first colored intermediate image;

fusing the brightness-aligned first colored intermediate image and the second colored intermediate image to obtain a colored initial merged image;

performing the interpolation process on the colored initial merged image according to the first panchromatic intermediate image to obtain a colored intermediate merged image with the resolution equal to the resolution of the pixel array; and fusing the colored intermediate merged image and the first panchromatic intermediate image to obtain the target image.

* * * * *